United States Patent
Zhang et al.

(10) Patent No.: US 11,464,075 B2
(45) Date of Patent: Oct. 4, 2022

(54) METHOD AND APPARATUS FOR CONFIGURATION OF REFERENCE SIGNAL

(71) Applicant: Apple Inc., Cupertino, CA (US)

(72) Inventors: Yushu Zhang, Beijing (CN); Gang Xiong, Portland, OR (US); Guotong Wang, Beijing (CN); Alexei Davydov, Nizhny Novgorod (RU)

(73) Assignee: Apple Inc., Cupertino, CA (US)

(*) Notice: Subject to any disclaimer, the term of this patent is extended or adjusted under 35 U.S.C. 154(b) by 23 days.

(21) Appl. No.: 16/646,176

(22) PCT Filed: Sep. 10, 2018

(86) PCT No.: PCT/CN2018/104791
§ 371 (c)(1),
(2) Date: Mar. 11, 2020

(87) PCT Pub. No.: WO2019/047945
PCT Pub. Date: Mar. 14, 2019

(65) Prior Publication Data
US 2020/0275523 A1 Aug. 27, 2020

(30) Foreign Application Priority Data

Sep. 11, 2017 (WO) ................ PCT/CN2017/101209
Oct. 3, 2017 (WO) ................ PCT/CN2017/105240

(51) Int. Cl.
*H04W 72/04* (2009.01)
*H04W 88/06* (2009.01)
(Continued)

(52) U.S. Cl.
CPC .......... *H04W 88/06* (2013.01); *H04B 7/0626* (2013.01); *H04B 7/0695* (2013.01);
(Continued)

(58) Field of Classification Search
CPC ... H04W 88/06; H04W 76/27; H04W 56/001; H04W 80/02; H04W 80/08;
(Continued)

(56) References Cited

U.S. PATENT DOCUMENTS

2014/0036870 A1* 2/2014 Skov ................ H04W 56/00
370/331
2016/0095102 A1 3/2016 Yu et al.
(Continued)

FOREIGN PATENT DOCUMENTS

WO 2016/179804 A1 11/2016

OTHER PUBLICATIONS

International Search Report dated Dec. 5, 2018 for International Application No. PCT/CN2018/104791.
(Continued)

*Primary Examiner* — Hassan Kizou
*Assistant Examiner* — Mahbubul Bar Chowdhury
(74) *Attorney, Agent, or Firm* — Eschweiler & Potashnik, LLC

(57) ABSTRACT

Provided herein are method and apparatus for configuration of a Reference Signal (RS) and a Tracking Reference Signal (TRS). An embodiment provides an apparatus for an access node including a radio frequency (RF) interface; and processing circuitry configured to: determine a time density of a Tracking Reference Signal (TRS) based on a subcarrier spacing of a bandwidth part (BWP) in a current component carrier for a user equipment (UE); determine a frequency density of the TRS based on a bandwidth of the TRS; determine a quasi co-location (QCL) relationship of the TRS; and encode the TRS based on at least one of the time density, the frequency density and the QCL relationship for transmission to the UE via the RF interface. At least some
(Continued)

embodiments allow for beam management, and allow for fine time and/or frequency offset tracking.

12 Claims, 13 Drawing Sheets

(51) Int. Cl.
| | |
|---|---|
| *H04W 76/27* | (2018.01) |
| *H04B 7/06* | (2006.01) |
| *H04B 7/08* | (2006.01) |
| *H04L 5/00* | (2006.01) |
| *H04W 56/00* | (2009.01) |
| *H04W 80/02* | (2009.01) |
| *H04W 80/08* | (2009.01) |

(52) U.S. Cl.
CPC ............ *H04B 7/088* (2013.01); *H04L 5/005* (2013.01); *H04L 5/0025* (2013.01); *H04L 5/0092* (2013.01); *H04W 56/001* (2013.01); *H04W 76/27* (2018.02); *H04W 80/02* (2013.01); *H04W 80/08* (2013.01)

(58) Field of Classification Search
CPC .... H04B 7/0626; H04B 7/0695; H04B 7/088; H04L 5/0025; H04L 5/005; H04L 5/0092; H04L 5/0091; H04L 5/0048; H04L 5/0053
See application file for complete search history.

(56) References Cited

U.S. PATENT DOCUMENTS

| | | | | |
|---|---|---|---|---|
| 2018/0167946 | A1* | 6/2018 | Si | H04L 1/0061 |
| 2018/0205526 | A1* | 7/2018 | Kim | H04L 5/00 |
| 2018/0323933 | A1* | 11/2018 | Nam | H04L 5/0051 |
| 2019/0052443 | A1* | 2/2019 | Cheng | H04L 5/0057 |
| 2019/0058517 | A1* | 2/2019 | Kang | H04L 5/0048 |
| 2019/0379431 | A1* | 12/2019 | Park | H04L 5/0048 |
| 2020/0136767 | A1* | 4/2020 | Ernström et al. | H04L 27/0014 |
| 2020/0146107 | A1* | 5/2020 | Xiong | H04W 76/27 |
| 2020/0186311 | A1* | 6/2020 | Xu | H04W 72/044 |
| 2021/0037505 | A1* | 2/2021 | Kim | H04W 72/04 |
| 2021/0051048 | A1* | 2/2021 | Ernström et al. | H04L 27/0014 |
| 2021/0168011 | A1* | 6/2021 | Davydov | H04W 72/042 |

OTHER PUBLICATIONS

"Reference Signal for fine time and frequency tracking." Source: Huawei, HiSilicon. Agenda Item: 7.1.2.4.6. 3GPP TSG RAN WG1 Meeting #89, Hangzhou, China May 15-19, 2017. R1-1706939.
"Discussion on Phase Tracking RS Design." Agenda Item: 8.1.2.4.3. Source: Xinwei. 3GPP TSG-RAN WG1 #88b, Spokane, US, Apr. 3-7, 2017. R1-1704666.
Extended European Search Report dated Apr. 29, 2021 for European Application No. 18854523.0.
Samsung: "Discussions on fine time/frequency tracking for NR", 3GPP Draft; R1-1713608 Tracking RS for NR_V0, 3rd Generation Partnership Project (3GPP), Mobile Competence Centre ; 650, Route Des Lucioles ; F-06921 Sophia-Antipolis Cedex; France vol. RAN WG1, No. Prague, Czechia; Aug. 21, 2017-Aug. 25, 2017 Aug. 20, 2017 (Aug. 20, 2017), XP051316408.
Intel Corporation: "On Phase Tracking for NR", 3GPP Draft; R1-1611981 on Phase Tracking for NR, 3rd Generation Partnership Project(3GPP), Mobile Competence Centre ; 650, Route Des Lucioles; F-06921 Sophia-Antipolis Cedex ; France vol. RAN WG1, No. Reno, USA; Nov. 14, 2016-Nov. 18, 2016 Nov. 13, 2016(Nov. 13, 2016), XP051175945.
Ericsson: "On DL PTRS design", 3GPP Draft; R1-1714314 on DL PTRS Design, 3rd Generation Partnership Project (3GPP), Mobile Competence Centre ; 650, Route Des Lucioles ; F-06921 Sophia-Antipolis Cedex France vol. RAN WG1, No. Prague, Czechia; Aug. 21, 2017-Aug. 25, 2017 Aug. 20, 2017 (Aug. 20, 2017), XP051317100.
Apple Inc: "Configuration of Synchronization and Tracking RS in wideband carrier", 3GPP Draft; R1-1708278 Synchronization and Tracking in Wideband Carrier, 3rd Generation Partnership Project (3GPP), Mobile Competence Centre ; 650, Route Des Lucioles; F-06921 Sophia-Antipolis Cedex, vol. RAN WG1, No. Hangzhou; May 15, 2017-May 19, 2017 May 14, 2017 (May 14, 2017), XP051273471.
Qualcomm Incorporated: "Discussion on QCL", 3GPP Draft; R1-1711176, 3rd Generation Partnership Project (3GPP), Mobile Competence Centre ; 650, Route Des Lucioles; F-06921 Sophia-Antipolis Cedex; France, vol. RAN WG1, No. Qingdao, China; Jun. 27, 2017-Jun. 30, 2017 Jun. 17, 2017 (Jun. 17, 2017), XP051305457.

* cited by examiner

METHOD AND APPARATUS FOR CONFIGURATION OF REFERENCE SIGNAL

CROSS REFERENCES TO RELATED APPLICATIONS

This application is a National Phase entry application of International Patent Application No. PCT/CN2018/104791 filed Sep. 10, 2018, which claims priority to International Application No. PCT/CN2017/105240 filed on Oct. 3, 2017, entitled "USER EQUIPMENT SUGGESTED REFERENCE SIGNAL CONFIGURATION", and International Application No. PCT/CN2017/101209 filed on Sep. 11, 2017, entitled "TRACKING REFERENCE SIGNAL CONFIGURATION", and are hereby incorporated by reference in its entirety.

TECHNICAL FIELD

Embodiments of the present disclosure generally relate to a method and apparatus for wireless communications, and in particular to a method and apparatus for configuration of a Reference Signal (RS) and a Tracking Reference Signal (TRS).

BACKGROUND ART

In a Multiple-Input and Multiple-Output (MIMO) system (such as a fifth generation (5G) system) operating in high band (e.g., above 6 GHz), analog beamforming can be applied. An access node (such as a next Generation NodeB (gNB)) and a user equipment (UE) may each maintain a plurality of beams. There may be multiple beam pair links (BPLs) between the access node and the UE, which can provide a good beamforming gain. A good BPL can help to increase link budget. A beam management procedure can be used to find out a good BPL (such as a good gNB-UE BPL). Some beam sweeping based reference signals, such as a Synchronization Signal (SS) block and a Channel State Information Reference Signal (CSI-RS), can be used to assist in the beam management procedure to find out a good BPL. It is possible to apply wide beams for SS blocks, and the access node may configure some CSI-RS resources with narrow beams on top of the best SS block(s). Further, the access node may configure a subset of SS block beams or resources among all the SS block beams or resources for beam measurement, so as to reduce the number of SS block beams or resources to be measured by the UE. The access node may also configure a subset of CSI-RS beams or resources among all the CSI-RS beams or resources for beam measurement, so as to reduce the number of CSI-RS beams or resources to be measured by the UE. Therefore, if only a subset of beams or resources is configured for a UE's beam measurement, there is a need to find out some new better beams outside of the configured beams or resources when necessary.

A Tracking Reference Signal (TRS) may be used for fine time and/or frequency offset tracking for a MIMO system (such as a 5G system). One TRS instance may be transmitted in N slots, and a UE may estimate a Doppler spread by using the TRS within the N slots, to estimate a time and/or frequency offset. Estimation of a time offset may be based on an average estimation for each of symbols for a TRS instance. Therefore, it is important and necessary to determine a value of N, namely the number of slots for a TRS instance. Further, for a multi Transmission Reception Points (multi-TRP) operation, a UE should measure a time and/or frequency offset for different TRPs. However different TRPs may have different numerologies or different time offset. In the case of measuring a time and/or frequency offset for an assistant TRP (such as an assistant gNB or a neighbor gNB) for a multi-TRP operation, a UE may not be able to receive a signal from a current TRP (such as a current gNB). Therefore, there is a need to provide time and/or frequency offset tracking for multiple TRPs. In addition, a multi-beam operation may be applied to a TRS, and different beams may have different time and/or frequency offset. Therefore, there is a need to identify a beam of each TRS.

SUMMARY

An embodiment of the disclosure provides an apparatus for an access node including a radio frequency (RF) interface; and processing circuitry configured to: determine a time density of a Tracking Reference Signal (TRS) based on a subcarrier spacing of a bandwidth part (BWP) in a current component carrier for a user equipment (UE); determine a frequency density of the TRS based on a bandwidth of the TRS; determine a quasi co-location (QCL) relationship of the TRS; and encode the TRS based on at least one of the time density, the frequency density and the QCL relationship for transmission to the UE via the RF interface.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Figure 1:
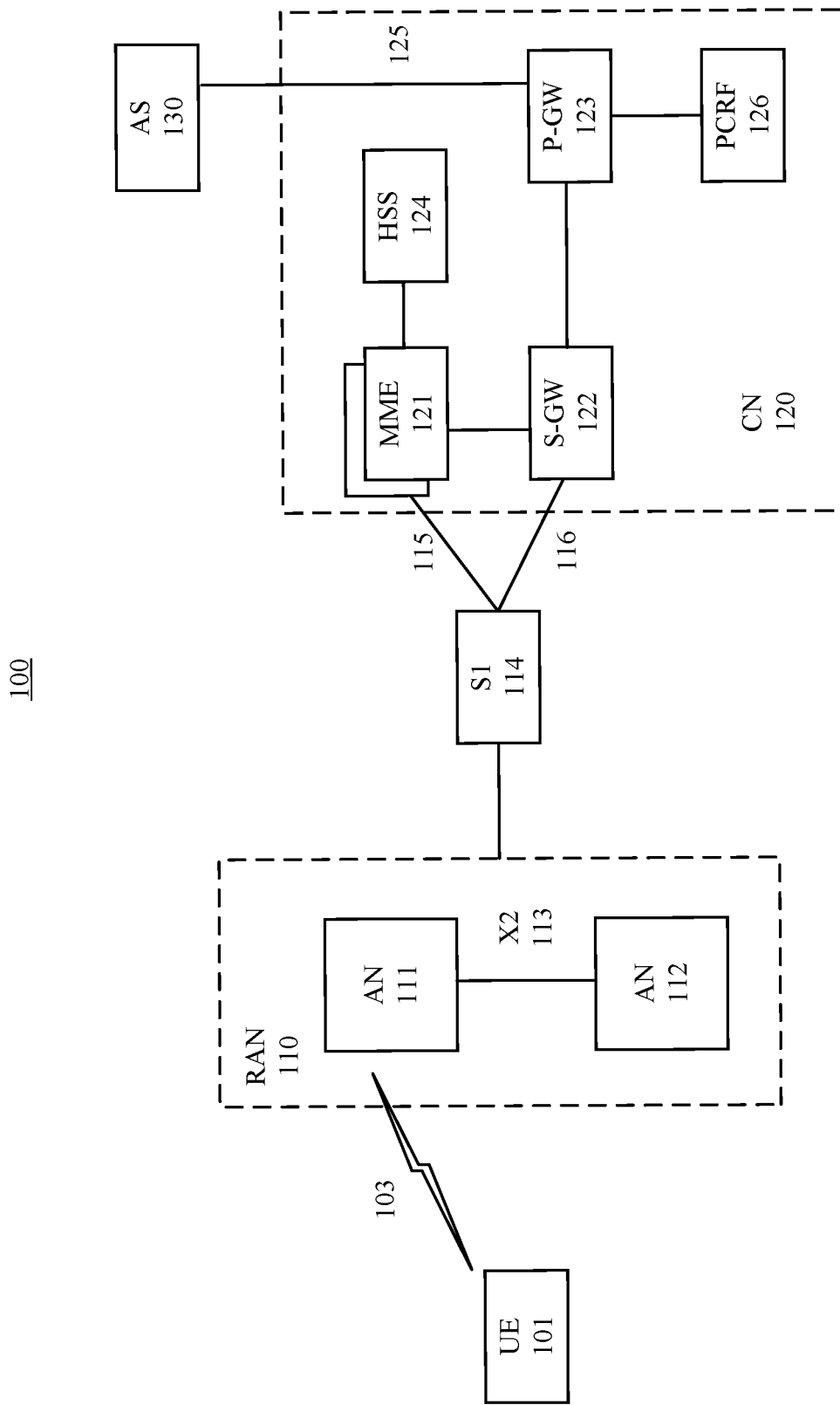
FIG. 1 illustrates an architecture of a system of a network in accordance with some embodiments of the disclosure.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

As discussed previously, some reference signals which can support a beam sweeping operation (such as an SS block and a CSI-RS) can be used to assist in a beam management procedure to find out one or more good BPLs between an access node (such as a gNB) and a UE. It is possible to apply wide beams for SS blocks, and the access node may configure some CSI-RS resources with narrow beams on top of the best SS block(s). The access node may configure a subset of SS block beams or resources among all the SS block beams or resources for beam measurement, and may also configure a subset of CSI-RS beams or resources among all the CSI-RS beams or resources for beam measurement, so as to reduce the number of SS block or CSI-RS beams or resources to be measured by the UE. In the case that only a subset of beams or resources are configured for a UE's beam measurement, if beam quality of beams in the configured subset of beams or resources are not good enough, there is a need to find out one or more beams not within the configured subset that have better beam quality.

The present disclosure provides approaches for configuration of a RS for beam management. In accordance with some embodiments of the disclosure, a plurality of RSs received via a plurality of beams of an access node for the plurality of RSs may be decoded. First beam quality for each of a predefined subset of beams among the plurality of beams may then be determined based on the decoded RSs, and second beam quality for the predefined subset of beams (namely, overall beam quality for the predefined subset of beams) may be determined based on all of the first beam quality. In response to the second beam quality is below a predetermined threshold, third beam quality for each of one or more beams among the plurality of beams that are not within the predefined subset may be determined based on the decoded RSs. A message may be encoded based on the first and third beam quality for transmission to the access node for beam management, wherein the message identifies one or more beam indexes for one or more SS blocks.

As discussed previously, a TRS may be used for fine time and/or frequency offset tracking for a MIMO system (such as a 5G system). One TRS instance may be transmitted in N slots, and a UE may estimate a Doppler spread by using the TRS within the N slots, to estimate a time and/or frequency offset. Estimation of a time offset may be based on an average estimation for each of symbols for a TRS instance. Therefore, it is important and necessary to determine a value of N, namely the number of slots for a TRS instance. Further, for a multi-TRP operation, a UE should measure a time and/or frequency offset for different TRPs. However different TRPs may have different numerologies or different time offset. In the case of measuring a time and/or frequency offset for an assistant TRP (such as an assistant gNB or a neighbor gNB) for a multi-TRP operation, a UE may not be able to receive a signal from a current TRP (such as a current gNB). Therefore, there is a need to provide a time and/or frequency offset tracking for multiple TRPs. In addition, a multi-beam operation may be applied to a TRS, and different beams may have different time and/or frequency offset. Therefore, there is a need to identify a beam of each TRS.

The present disclosure provides approaches for configuration of a TRS. In accordance with some embodiments of the disclosure, a time density of a TRS may be determined based on a subcarrier spacing of a bandwidth part (BWP) in a current component carrier for a UE, a frequency density of the TRS may be determined based on a bandwidth of the TRS, and a quasi co-location (QCL) relationship of the TRS may be determined. Then the TRS may be encoded based on at least one of the time density, the frequency density and the QCL relationship for transmission to the UE.

FIG. 1 illustrates an architecture of a system 100 of a network in accordance with some embodiments. The system 100 is shown to include a user equipment (UE) 101. The UE 101 is illustrated as a smartphone (e.g., handheld touch-screen mobile computing devices connectable to one or more cellular networks), but may also include any mobile or non-mobile computing device, such as a personal data assistant (PDA), a tablet, a pager, a laptop computer, a desktop computer, a wireless handset, or any computing device including a wireless communications interface.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a NextGen RAN (NG RAN), or some other type of RAN. The UE 101 may utilize a connection 103 which comprises a physical communications interface or layer (discussed in further detail below); in this example, the connection 103 is illustrated as an air interface to enable communicative coupling and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs) that enable the connection 103. These access nodes may be referred to as base stations (BS s), NodeBs, evolved NodeBs (eNBs), next Generation NodeBs (gNB), RAN nodes, and so forth, and may include ground stations (e.g., terrestrial access points) or satellite stations providing coverage within a geographic area (e.g., a cell). As shown in FIG. 1, for example, the RAN 110 may include AN 111 and AN 112. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to macro ANs. For example, one or both of the AN 111 and AN 112 may be a low power (LP) AN. In an embodiment, the AN 111 and AN 112 may be the same type of AN. In another embodiment, they are different types of ANs.

Any of the ANs 111 and 112 may terminate the air interface protocol and may be the first point of contact for the UE 101. In some embodiments, any of the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with any of the ANs 111 and 112 or with other UEs (not shown) over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals may include a plurality of orthogonal subcarriers.

In some embodiments, a downlink resource grid may be used for downlink transmissions from any of the ANs 111 and 112 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and H-ARQ (Hybrid Automatic Repeat Request) information related to the uplink shared channel. Typically, downlink scheduling (assigning control and shared channel resource blocks to the UE 101 within a cell) may be performed at any of the ANs 111 and 112 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and the serving gateway (S-GW) 122.

In an embodiment, the CN 120 may comprise the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface 125. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
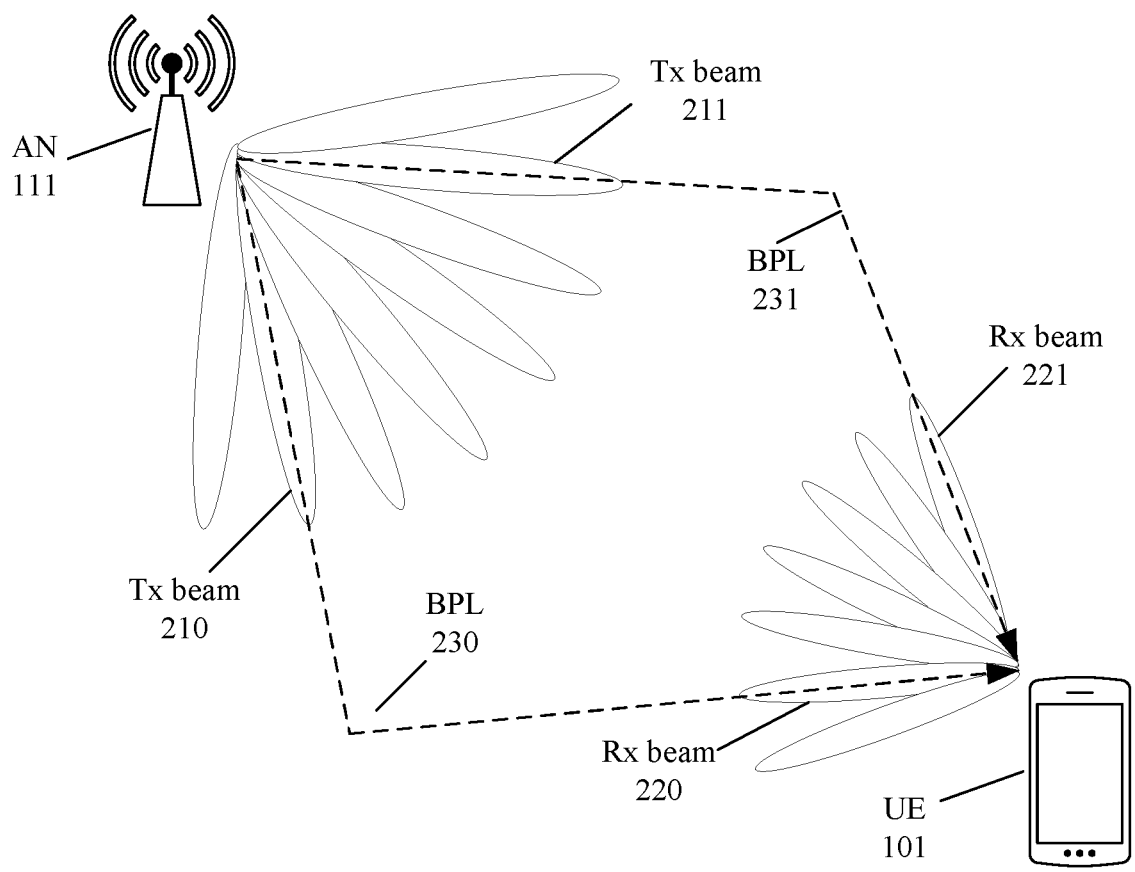
FIG. 2 illustrates an example for one or more BPLs between a UE and an access node in accordance with some embodiments of the disclosure.

FIG. 2 illustrates an example for one or more BPLs between a UE and an access node in accordance with some embodiments of the disclosure. In the example of FIG. 2, the AN 111 may maintain a plurality of transmit (Tx) beams including a Tx beam 210 and a Tx beam 211, and the UE 101 may maintain a plurality of receive (Rx) beams including a Rx beam 220 and a Rx beam 221. There may be one or more BPLs between the AN 111 and UE 101, wherein each of the BPLs may be formed by a Tx beam of the AN 111 and a Rx beam of the UE 101. For example, as shown in FIG. 2, a BPL 230 may be formed by the Tx beam 210 of the AN 111 and the Rx beam 220 of the UE 101, and a BPL 231 may be formed by the Tx beam 211 of the AN 111 and the Rx beam 221 of the UE 101.

It should be understood that, the number of Tx beams of the AN 111, Rx beams of the UE 101 and/or BPLs between the AN 111 and the UE 101 illustrated in FIG. 2 is provided for explanatory purposes only and is not limited herein.

Figure 3:
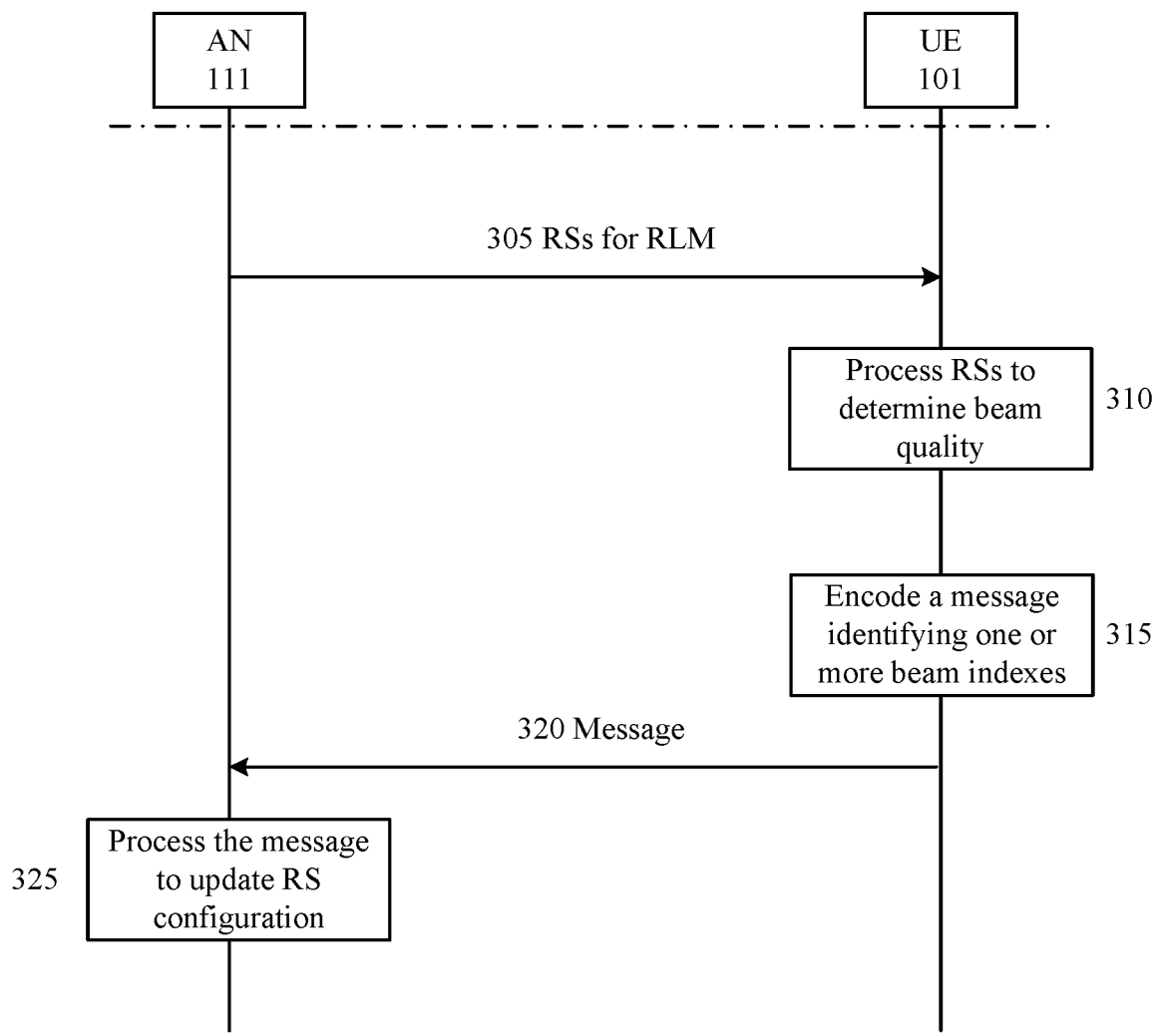
FIG. 3 is a flow chart showing operations for configuration of a RS for beam management in accordance with some embodiments of the disclosure.

FIG. 3 is a flow chart showing operations for configuration of a RS for beam management in accordance with some embodiments of the disclosure. The operations of FIG. 3 may be used for a UE (e.g., UE 101) to recommend a configuration of a RS (such as an SS block or a CSI-RS) to an AN (e.g., AN 111) of a RAN (e.g., RAN 110) for beam management.

The AN 111 may process (e.g., modulate, encode, etc.) a plurality of RSs, and transmit, at 305, the processed RSs to the UE 101 via a plurality of beams of the AN 111 for the plurality of RSs for use in radio link monitoring (RLM). In an embodiment, the plurality of RSs may be transmitted with a beam sweeping operation. The plurality of RSs may be a plurality of SS blocks or a plurality of CSI-RSs, which may be predefined or configured by a higher layer signaling. In an embodiment, an SS block may include a Primary SS (PSS), a secondary SS (SSS) and a Physical Broadcast Channel (PBCH). In an embodiment, an SS block may also include a Demodulation Reference Signal (DMRS) used for common control channel.

Figure 4A:
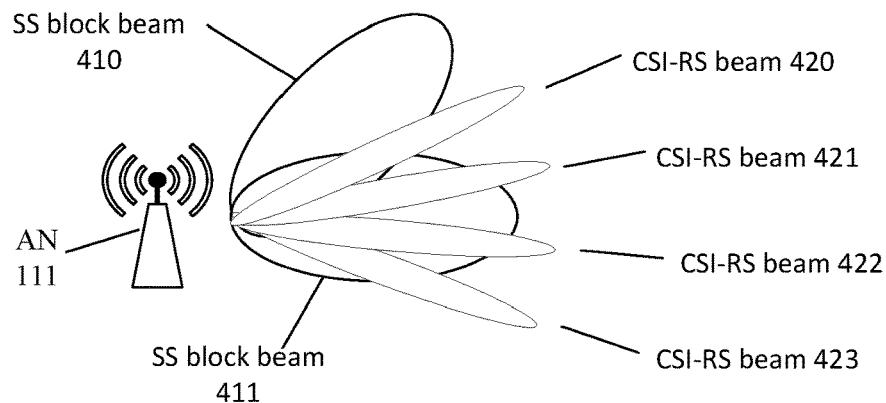
FIG. 4A illustrates an example beam pattern for SS blocks and CSI-RS s in accordance with some embodiments of the disclosure.

As discussed previously, it is possible to apply wide beams for SS blocks, and the AN 111 may configure some CSI-RS resources with narrow beams on top of the best SS block(s). For example, as shown in FIG. 4A, wide beams (namely, SS block beams 410 and 411) are applied to SS blocks, and several narrow beams (namely, CSI-RS beams 420-423) are configured around or on top of the SS block beam 410 which is identified as a coarse transmission direction.

The UE 101 may receive the plurality of RSs that the AN 111 transmitted via the plurality of beams at 305, and process (e.g., demodulate, decode, detect, etc.), at 310, the received RSs to determine first beam quality for each of a predefined subset of beams among the plurality of beams based on the processed RSs and to further determine second beam quality for the predefined subset of beams based on all of the first beam quality.

The AN 111 may configure a predefined subset of RS beams or resources among all the plurality of RS beams or resources for beam measurement at the UE 101, the number of beams or resources in the predefined subset may be N, and the number of all the beams or resources may be M, wherein N may be smaller than M. In an embodiment, M may indicate the number of SS blocks in an SS block burst. The predefined subset of RS beams or resources may not cover all transmission directions associated with all the plurality of RS beams or resources.

In an embodiment, the UE 101 may process (e.g., modulate, encode, etc.) an indicator for transmission to the AN 111, wherein the indicator may indicate the maximum number of beams or resources (such as SS block or CSI-RS beams or resources) to be measured by the UE 101 in a frame or a timing window. That is to say, the indicator may indicate the processing capability of the UE 101 to process beams or resources during a certain time period. In an embodiment, the AN 111 may then determine or configure, based on the indicator received from the UE 101, the number of beams in the predefined subset for beam measurement and management.

In an embodiment, for each of RSs associated with the one or more beams not within the predefined subset, a data channel or dedicated signal may be transmitted in a slot for the RS. In an embodiment, for each of RSs associated with the predefined subset of beams, no data channel or dedicated signal (such as a PDSCH) may be transmitted in a slot for the RS.

In an embodiment, the first beam quality for each of the predefined subset of beams may be determined by measuring a Signal to Interference plus Noise Ratio (SINR), a Reference Signal Receiving Power (RSRP) or Reference Signal Receiving Quality (RSRQ) of the beam. The second beam quality may indicate overall beam quality for the predefined subset of beams. In an embodiment, the second beam quality may be an average of all of the first beam quality.

In response to the second beam quality (namely, the overall beam quality for the predefined subset of beams) being below a predetermined threshold, the UE 101 may further determine, based on the processed RSs, third beam quality for each of one or more beams among the plurality of beams that are not within the predefined subset. In an embodiment, the third beam quality for each of the one or more beams may be determined by measuring a Signal to Interference plus Noise Ratio (SINR), a Reference Signal Receiving Power (RSRP) or Reference Signal Receiving Quality (RSRQ) of the beam. In an embodiment, the predetermined threshold may be predefined or configured by a higher layer signaling.

That is to say, the predefined subset of RS beams or resources may be viewed as a subset of all the plurality of RS beams or resources, and the UE 101 may firstly perform beam measurement over the predefined subset of RS beams or resources so as to reduce the number of RS beams or resources to be measured by the UE 101. If beam quality of beams in the predefined subset does meet a threshold requirement (e.g., above the predetermined threshold), the UE 101 may not need to perform beam measurement over beams not within the predefined subset. However, if beam quality of beams in the predefined subset does not meet the threshold requirement (e.g., below the predetermined threshold), the UE 101 may need to perform beam measurement over beams not within the predefined subset to find out one or more other beams not within the predefined subset that have better beam quality.

At 315, the UE 101 may then process (e.g., modulate, encode, etc.), based on the first and third beam quality, a message for transmission to the AN 111 for beam management, wherein the message identifies one or more beam indexes for one or more SS blocks. In an embodiment, each of the beam indexes may be a timing index carried by a Demodulation Reference Signal (DMRS) of a Physical Broadcast Channel (PBCH) of an SS block associated with the beam index. In an embodiment, the message may further identify beam quality for each of one or more beams corresponding to the one or more beam indexes. In an embodiment, whether the UE 101 can process the message for transmission to the AN 111 or not may be configured by a higher layer signaling or may be predefined.

In an embodiment, the message may further identify one or more flags for the one or more beam indexes, and in the case that the plurality of RSs are a plurality of SS blocks, each of the flags may indicate one of: whether to recommend the AN 111 to add an SS beam corresponding to the beam index associated with the flag into the predefined subset for beam measurement; and whether to recommend the AN 111 to remove an SS beam corresponding to the beam index associated with the flag from the predefined subset.

Figure 4B:
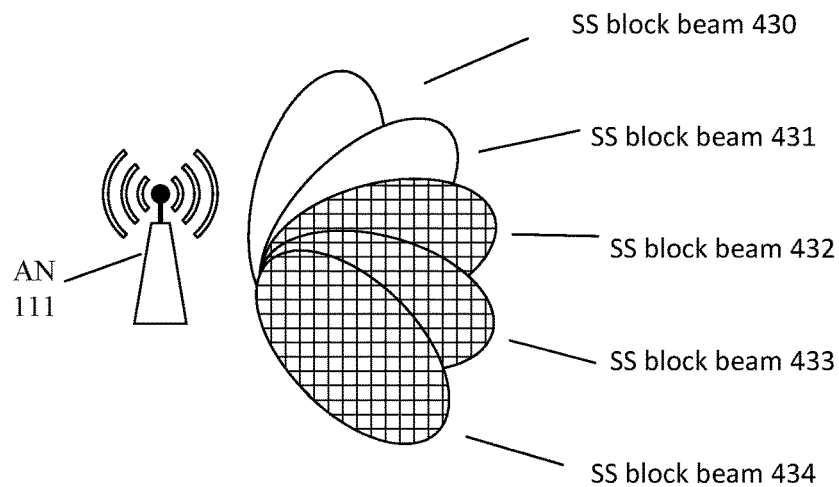
FIG. 4B illustrates an example SS block configuration in accordance with some embodiments of the disclosure.

In the case that the plurality of RSs are a plurality of SS blocks, as an example, FIG. 4B illustrates an example SS block configuration in accordance with some embodiments of the disclosure. As shown in FIG. 4B, the AN 111 may transmit a plurality of SS blocks via a plurality of SS block beams or resources 430-434. The AN 111 may configure a predefined subset of SS block beams or resources 432-434 (indicated with shadows in FIG. 4B) among all the plurality of SS block beams or resources 430-434 for beam measurement at the UE 101. In this example, the number of SS block beams or resources in the predefined subset may be 3, and the number of all the SS block beams or resources may be 5. As can be seen, the predefined subset of SS block beams or resources may not cover all transmission directions associated with all the plurality of SS block beams or resources.

The UE 101 may firstly perform beam measurement over the predefined subset of SS block beams or resources 432-434 so as to reduce the number of SS block beams or resources to be measured by the UE 101. If beam quality of beams in the predefined subset does meet a threshold requirement (e.g., above a first predetermined threshold $T_1$), the UE 101 may not need to perform beam measurement over beams not within the predefined subset. However, if beam quality of beams in the predefined subset does not meet the threshold requirement (e.g., below the first predetermined threshold $T_1$), the UE 101 may need to perform beam measurement over beams not within the predefined subset to find out one or more other beams not within the predefined subset that have better beam quality.

For example, if beam quality of beams in the predefined subset (namely, SS block beams or resources 432-434) does not meet the threshold requirement, the UE 101 may determine beam quality of SS block beams or resources 430-431. If the UE 101 determines that, for example, an SS block beam 431 is a beam having better beam quality, the UE 101 may process (e.g., modulate, encode, etc.) a message for transmission to the AN 111, wherein the message may identify a beam index of the SS block beam 431 to implicitly recommend the AN 111 to add the SS block beam or resource 431 corresponding to the beam index identified by the message for beam measurement. Alternatively, the message may further identify a flag for the beam index of the SS block beam 431, to explicitly recommend the AN 111 to add the SS block beam or resource 431 corresponding to the beam index associated with the flag for beam measurement. In addition, the message may further identify one or more beam indexes of one or more SS block beams or resources within the predefined subset that have bad beam quality, to implicitly recommend the AN 111 to remove one or more SS block beams or resources corresponding to the one or more beam indexes identified by the message. For example, if beam quality of the SS block beam 434 is not good enough, the message may identify a beam index of the SS block beam 434, to implicitly recommend the AN 111 to remove the SS block beam or resource 434 corresponding to the beam index identified by the message. Alternatively, the message may further identify a flag for the beam index of the SS block beam 434, to explicitly recommend the AN 111 to remove the SS block beam or resource 434 corresponding to the beam index associated with the flag.

It should be understood that, the number of SS block beams and the number of beams in the predefined set illustrated in FIG. 4B are provided for explanatory purposes only and are not limited herein.

In an embodiment, the message may further identify one or more flags for the one or more beam indexes, and in the case that the plurality of RSs are a plurality of CSI-RSs, each of the flags may indicate one of: whether to recommend the AN 111 to add one or more CSI-RS beams into the predefined subset based on the beam index associated with the flag for beam measurement; and whether to recommend the AN 111 to remove one or more CSI-RS beams from the predefined subset based on the beam index associated with the flag.

Figure 4C:
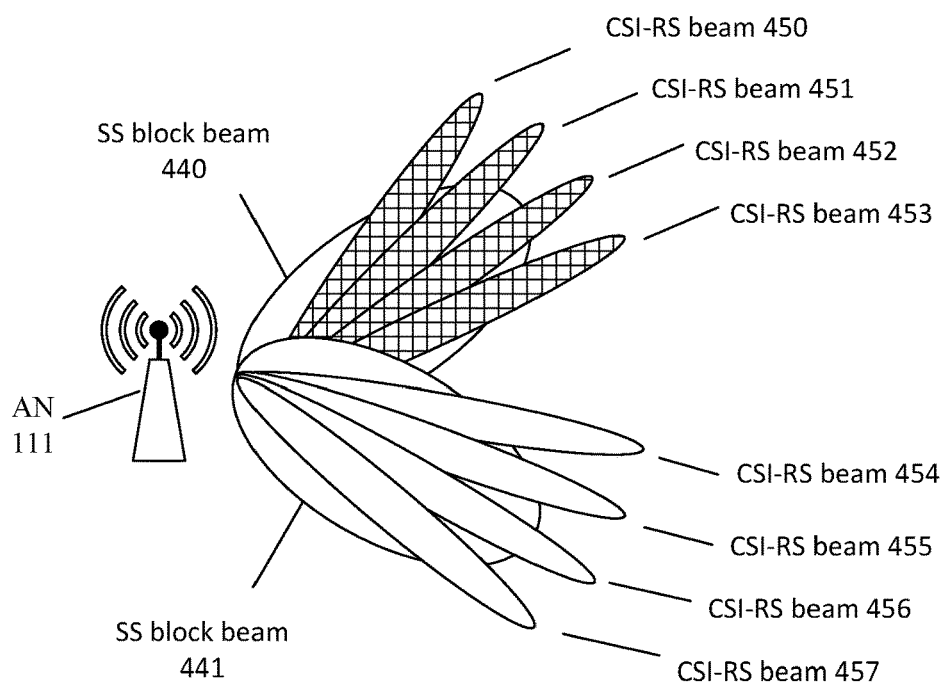
FIG. 4C illustrates an example CSI-RS configuration in accordance with some embodiments of the disclosure.

In the case that the plurality of RSs are a plurality of CSI-RSs, as an example, FIG. 4C illustrates an example CSI-RS configuration in accordance with some embodiments of the disclosure. As shown in FIG. 4C, the AN 111 may transmit a plurality of CSI-RSs via a plurality of CSI-RS beams or resources 450-457, wherein CSI-RS beams or resources 450-453 are configured around or on top of an SS block beam 440, and CSI-RS beams or resources 454-457 are configured around or on top of an SS block beam 441. The AN 111 may configure a predefined subset of CSI-RS beams or resources 450-453 (indicated with shadows in FIG. 4C) among all the plurality of CSI-RS beams or resources 450-457 for beam measurement at the UE 101. In this example, the number of CSI-RS beams or resources in the predefined subset may be 4, and the number of all the CSI-RS beams or resources may be 8. As can be seen, the predefined subset of CSI-RS beams or resources may not cover all transmission directions associated with all the plurality of CSI-RS beams or resources.

The UE 101 may firstly perform beam measurement over the predefined subset of CSI-RS beams or resources 450-453 so as to reduce the number of CSI-RS beams or resources to be measured by the UE 101. If beam quality of beams in the predefined subset does meet a threshold requirement (e.g., above a second predetermined threshold $T_2$), the UE 101 may not need to perform beam measurement over beams not within the predefined subset. However, if beam quality of beams in the predefined subset does not meet the threshold requirement (e.g., below the second predetermined threshold $T_2$), the UE 101 may need to perform beam measurement over beams not within the predefined subset to find out one or more other beams not within the predefined subset that have better beam quality.

For example, if beam quality of beams in the predefined subset (namely, CSI-RS beams or resources 450-453) does not meet the threshold requirement, the UE 101 may determine beam quality of CSI-RS beams or resources 454-457. If the UE 101 determines that, for example, one or more of CSI-RS beams or resources 454-457 have better beam quality, the UE 101 may process (e.g., modulate, encode, etc.) a message for transmission to the AN 111, wherein the message may identify a beam index of the SS block beam 441 associated with the CSI-RS beams or resources 454-457, to implicitly recommend the AN 111 to update a CSI-RS configuration to add some CSI-RS beams or resources around or on top of the SS block beam 441 corresponding to the beam index identified by the message for beam measurement. Alternatively, the message may further identify a flag for the beam index of the SS block beam 441, to explicitly recommend the AN 111 to add some CSI-RS beams or resources around or on top of the SS block beam 441 corresponding to the beam index associated with the flag for beam measurement. In addition, the message may further identify one or more beam indexes of one or more SS block beams or resources associated with one or more CSI-RS beams or resources within the predefined subset that have bad beam quality, to implicitly recommend the AN 111 to update a CSI-RS configuration to remove one or more CSI-RS beams or resources around or on top of the one or more SS block beams or resources associated with the one or more beam indexes identified by the message. For example, if beam quality of the CSI-RS block beams 450-453 are not good enough, the message may identify a beam index of the SS block beam 440 associated with the CSI-RS beams or resources 450-453, to implicitly recommend the AN 111 to update a CSI-RS configuration to remove one or more CSI-RS beams or resources around or on top of the SS block beam or resource 440 associated with the beam index identified by the message. Alternatively, the message may further identify a flag for the beam index of the SS block beam 440, to explicitly recommend the AN 111 to update a CSI-RS configuration to remove one or more CSI-RS beams or resources around or on top of the SS block beam or resource 440 corresponding to the beam index associated with the flag.

It should be understood that, the number of SS block beams, the number of CSI-RS beams, and the number of beams in the predefined set illustrated in FIG. 4C are provided for explanatory purposes only and are not limited herein.

At 320, the UE 101 may transmit the message processed at 315 to the AN 111. In an embodiment, the message may be transmitted via a Physical Uplink Control Channel (PUCCH), a Medium Access Control (MAC) Control Element (CE), or a Radio Resource Control (RRC) signaling.

The AN 111 may receive the message transmitted at 320 by the UE 101, and process (e.g., demodulate, decode, detect, etc.), at 325, the received message to update a RS configuration to add or remove one or more beams based on the one or more beam indexes identified by the message.

Figure 5:
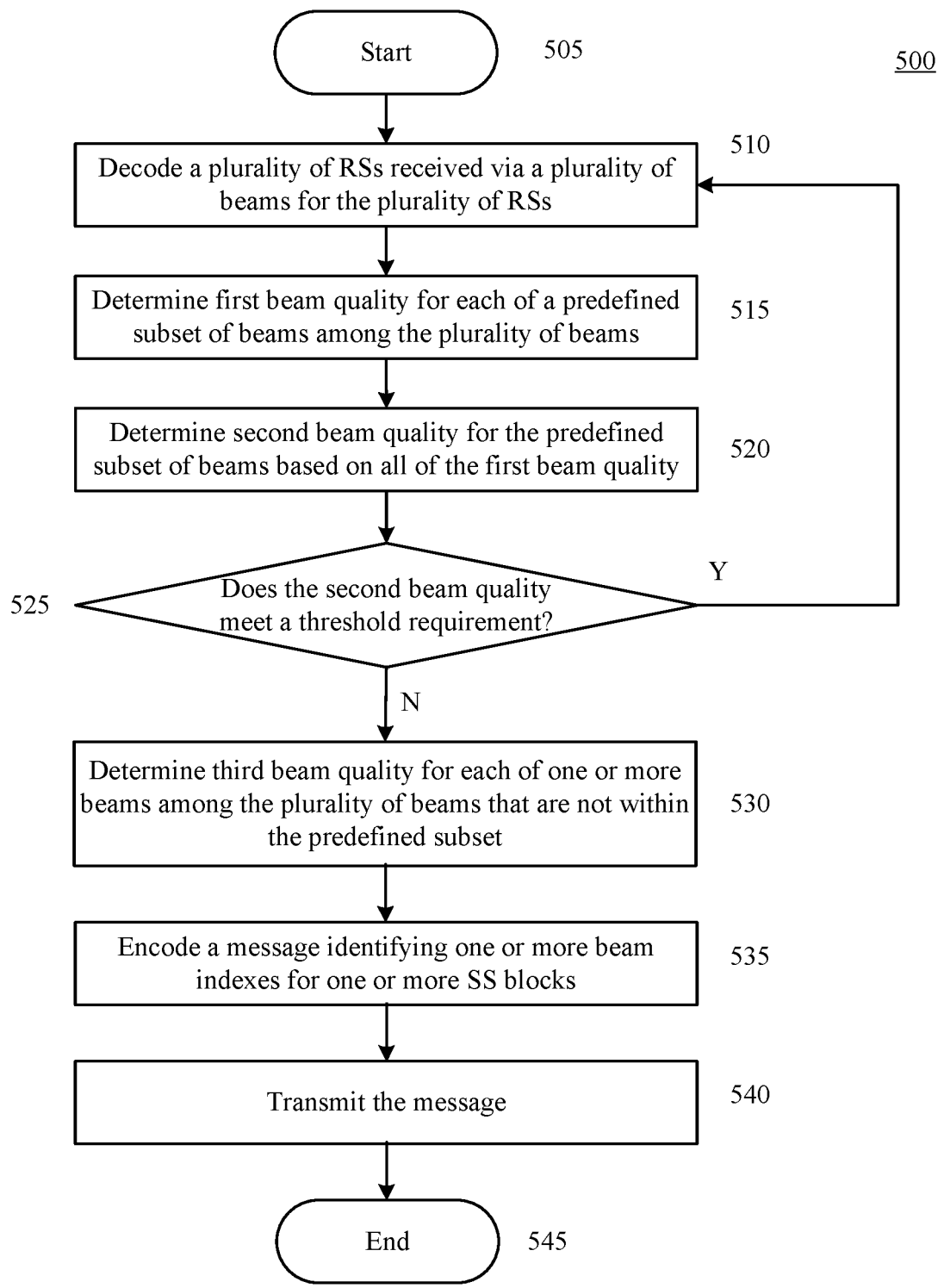
FIG. 5 is a flow chart showing a method performed by a UE for configuration of a RS for beam management in accordance with some embodiments of the disclosure.

FIG. 5 is a flow chart showing a method performed by a UE for configuration of a RS for beam management in accordance with some embodiments of the disclosure. The operations of FIG. 5 may be used for a UE (e.g., UE 101) to recommend a configuration of a RS (such as an SS block or a CSI-RS) to an AN (e.g., AN 111) of a RAN (e.g., RAN 110) for beam management.

The method starts at 505. At 510, the UE 101 may process (e.g., demodulate, decode, detect, etc.) a plurality of RS s received from the AN 111 via a plurality of beams of the AN 111 for the plurality of RSs. At 515, the UE 101 may determine, based on the processed RSs, first beam quality for each of a predefined subset of beams among the plurality of beams. At 520, the UE 101 may determine second beam quality for the predefined subset of beams based on all of the first beam quality. As discussed previously with reference to FIG. 3 in detail, beam quality of one beam may be determined by measuring a SINR, a RSRP or RSRQ of the beam.

Then, the UE 101 may determine whether the second beam quality for the predefined subset of beams meets a threshold requirement (e.g., above a predetermined threshold) at 525. If yes, the method may return back to 510, and if not, the method may proceed to 530, where the UE 101 may determine, based on the processed RS s, third beam quality for each of one or more beams among the plurality of beams that are not within the predefined subset.

At 535, the UE 101 may then process (e.g., modulate, encode, etc.), based on the first and third beam quality, a message for transmission to the AN 111 for beam management, wherein the message identifies one or more beam indexes for one or more SS blocks. At 540, the UE 101 may transmit the message to the AN 111.

For the sake of brevity, some embodiments which have already been described in detail with reference to FIG. 3 and FIGS. 4A-4C will not be repeated herein. The method ends at 545.

Figure 6:
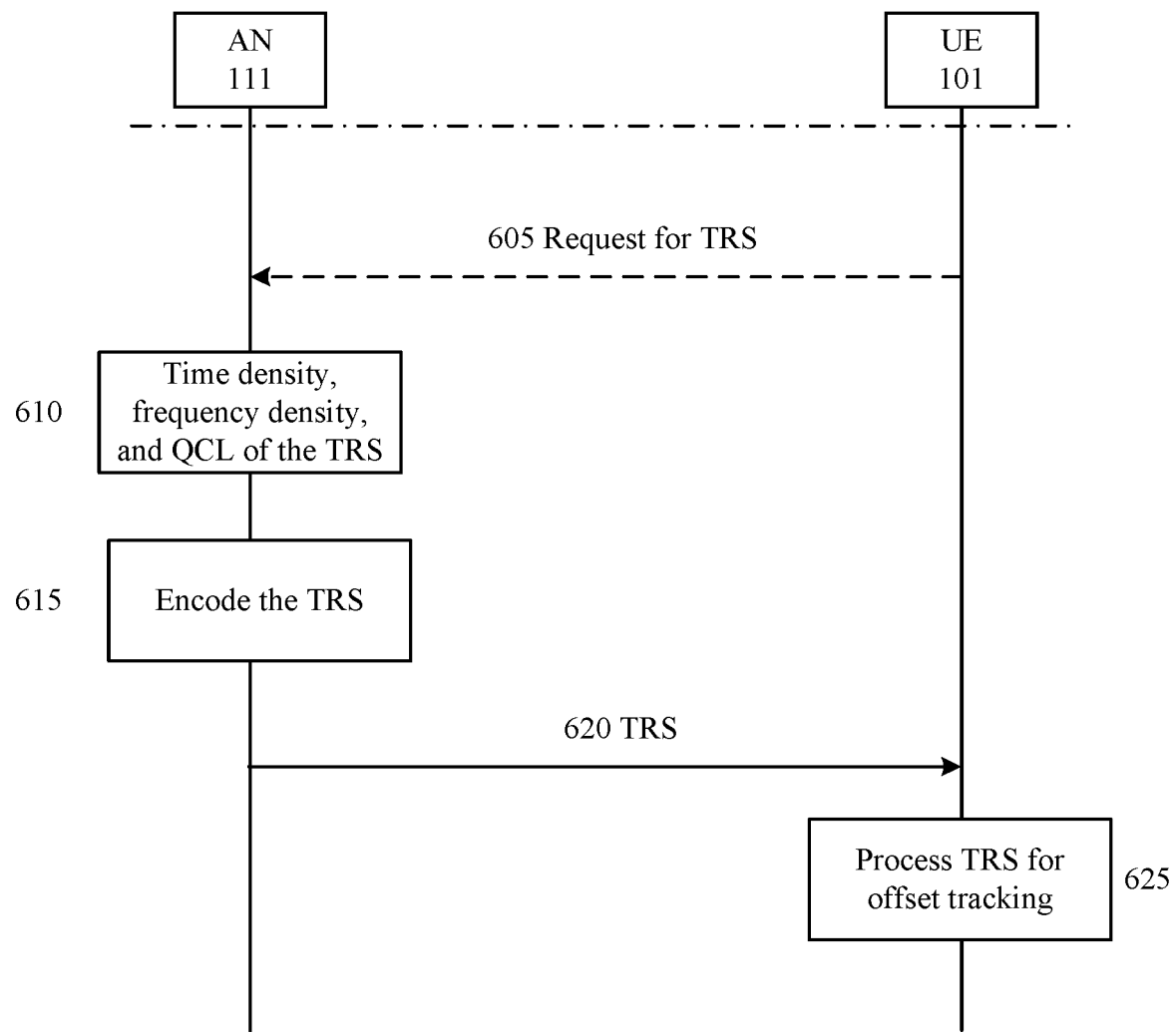
FIG. 6 is a flow chart showing operations for configuration of a TRS for time and/or frequency offset tracking.

FIG. 6 is a flow chart showing operations for configuration of a TRS for time and/or frequency offset tracking in accordance with some embodiments of the disclosure. The operations of FIG. 6 may be used for a UE (e.g., UE 101) to process a TRS received from an AN (e.g., AN 111) of a RAN (e.g., RAN 110) for time and/or frequency offset tracking.

Optionally, the UE 101 may process (e.g., modulate, encode, etc.) a request for a TRS, and transmit, at 605, the processed request to the AN 111 to trigger the AN 111 to process and transmit a TRS to the UE 101. In an embodiment, the processed request may be transmitted at 605 via a PUCCH, a PRACH, or a higher layer signaling.

In response to receiving the request transmitted at 605 from the UE 101, the AN 111 may determine at 610, a time density of a TRS based on a subcarrier spacing of a bandwidth part (BWP) in a current component carrier for the UE 101, a frequency density of the TRS based on a bandwidth of the TRS, and a quasi co-location (QCL) relationship of the TRS. Then at 615, the AN 111 may process (e.g., modulate, encode, determine, etc.) the TRS, based on at least one of the time density, the frequency density and the QCL relationship determined at 610, for transmission to the UE 101. It is to be noted that, it is optional for the UE 101 to process and transmit at 605 the request for a TRS, and it is not necessary for the AN 111 to process the TRS at 615 based on the time density, frequency density and QCL relationship of the TRS determined at 610 only in response to receiving a request for the TRS from the UE 101. In an embodiment, the AN 111 may also process the TRS at 615 based on the time density, frequency density and QCL relationship of the TRS determined at 610 in response to a higher layer signaling or a Downlink Control Information (DCI) or a combination thereof.

A TRS pattern should provide enough time and/or frequency offset tracking accuracy which may rely on a time density and a frequency density of the TRS pattern. For accurate Doppler offset estimation, the duration of one TRS instance (namely, the duration of one or more slots carrying the TRS instance) should be long enough. For example, a TRS may be mapped to 2 slots. However, since a subcarrier spacing of a BWP may vary, the duration of one slot may vary. Therefore, the number of slots for a TRS may vary, and may be determined based on a subcarrier spacing of a BWP. Alternatively, the number of slots for the TRS may be determined by a higher layer signaling or a DCI or a combination thereof. For example, in a 5G NR system, currently the number of slots for a TRS instance may be configured by a RRC signaling with a value selected from candidate values {1, 2}. In an embodiment, the time density of the TRS processed at 610 may indicate the number M of slots for the TRS. Table 1 as shown below illustrates an example of an association between the number of slots for a TRS instance (namely, the time density of a TRS) and a subcarrier spacing of a BWP for a UE. The association in Table 1 may be predefined or configured by a higher layer signaling.

TABLE 1 an example of an association between the number of slots for a TRS and a subcarrier spacing

| Subcarrier spacing | The number of slots for a TRS instance (M) |
|---|---|
| 15 kHz | 1 |
| 30 kHz, 60 kHz | 2 |
| >=120 kHz | 4 |

The total number of symbols for a TRS instance may be fixed or may be configured by a higher layer signaling. For example, in a 5G NR system, currently the number of symbols for a TRS per slot may be fixed to be 2. One or more symbol indexes for the TRS may be different for different subcarrier spacing. As an example, the number of symbols for a TRS instance may be fixed to 4, and if the TRS occupies 4 slots for example, then each symbol for the TRS may be mapped to each slot for the TRS, that is to say, the TRS may occupy one symbol per slot. In this example, the TRS may be evenly distributed in time domain. In addition, the TRS may not be mapped to a control Resource Set (COREST) for a UE. Then when a collision occurs, the collided symbol for the TRS may be shifted, or the whole TRS may be shifted, or the TRS may not be transmitted on the collided resource. Further, the same or different comb offset (which may indicate a subcarrier offset, and may indicate a location of a first Resource Element (RE) for the TRS in frequency domain) may be applied to different symbols, which may be predefined or configured by a higher layer signaling.

The channel estimation accuracy may rely on the frequency density of the TRS. In an embodiment, the frequency density may indicate the number N of subcarriers carrying the TRS in a symbol of a Physical Resource Block (PRB). As discussed previously, the AN 111 may determine the frequency density of the TRS based on the bandwidth of the TRS. In an embodiment, the bandwidth of the TRS may be determined based on at least one of: a bandwidth of the BWP, and the subcarrier spacing of the BWP. In an example, the bandwidth of the TRS may not be smaller than 24 RB, and may not be larger than min{50, Q} RB, where Q is the number of PRBs in the BWP. In another example, the bandwidth of the TRS may be the minimum of 52 and the number Q of PRBs in the BWP, or may be equal to the number Q of PRBs in the BWP. Alternatively, in another embodiment, the frequency density of the TRS may be fixed. Further, in yet another embodiment, the frequency density of the TRS may also be determined by the subcarrier spacing. Table 2 as shown below illustrates an example of an association between a bandwidth of a TRS and a frequency density of the TRS, wherein the subcarrier spacing is 30 KHz. The association in Table 2 may be predefined or configured by a higher layer signaling.

TABLE 2 an example of an association between a bandwidth of a TRS and a frequency density of the TRS

| Bandwidth for TRS | Frequency density of TRS |
|---|---|
| B <= 24 RB | 3 RE/RB/Symbol |
| 24 RB < B <= 50 RB | 2 RE/RB/Symbol |
| B > 50 RB | 1 RE/RB/Symbol |

Figure 7A:
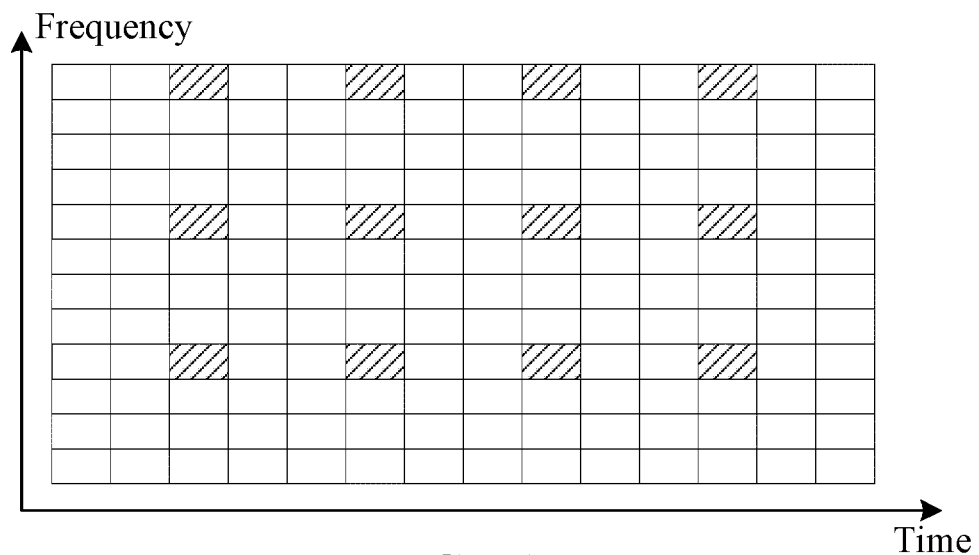
FIG. 7A illustrates an example of a TRS pattern in accordance with some embodiments of the disclosure.

FIG. 7A illustrates an example of a TRS pattern, wherein the number of slots for a TRS is 1, namely, M=1. Each resource element (RE) occupied by the TRS may be indicated with shadows, wherein one RE consists of a symbol in time domain and a subcarrier in frequency domain. As can be seen, the TRS occupies one slot which contains fourteen symbols in time domain (namely, the time density of the TRS is equal to 1), and four symbols among all the fourteen symbols are occupied by the TRS. In addition, in frequency domain, the TRS occupies three subcarriers among all the twelve subcarriers in each symbol occupied by the TRS of one PRB (which comprises fourteen symbols in time domain and twelve subcarriers in frequency domain) shown in FIG. 7A, that is to say, the frequency density of the TRS is equal to 3.

In addition, to support a multi-beam operation, multiple TRS resources may be configured. Within each TRS resource, information regarding the QCL relationship may be configured. In an embodiment, the QCL relationship of the TRS may be predefined or configured by a higher layer signaling. In an embodiment, the QCL relationship may indicate that the TRS is QCLed with an SS block or a CSI-RS for beam management, and thus a timing index of the SS block or a CSI-RS Resource Index (CRI) of the CSI-RS may be used to indicate a beam of the TRS. In an embodiment, the SS block or the CSI-RS may be within the BWP in the current component carrier. In another embodiment, the SS block or the CSI-RS may be within another BWP in the current component carrier or another component carrier, which is different from the BWP in the component carrier for the TRS. In an embodiment, the TRS may be transmitted in M−1 consecutive slots before or after the SS block or the CSI-RS QCLed with the TRS, wherein M may indicate the number of slots for the TRS (for example, may be determined with reference to Table 1), and related contents have already been described in detail previously and thus will not be repeated herein. In an embodiment, whether an SS block or a CSI-RS is configured to be QCLed with the TRS may be determined by a Layer 1 Reference Signal Receiving Power (L1-RSRP) reporting mode, which may indicate one of: a L1-RSRP reporting is based on a CSI-RS only, a L1-RSRP reporting is based on an SS block only, and a L1-RSRP reporting is based on both of a CSI-RS and an SS block.

Figure 7B:
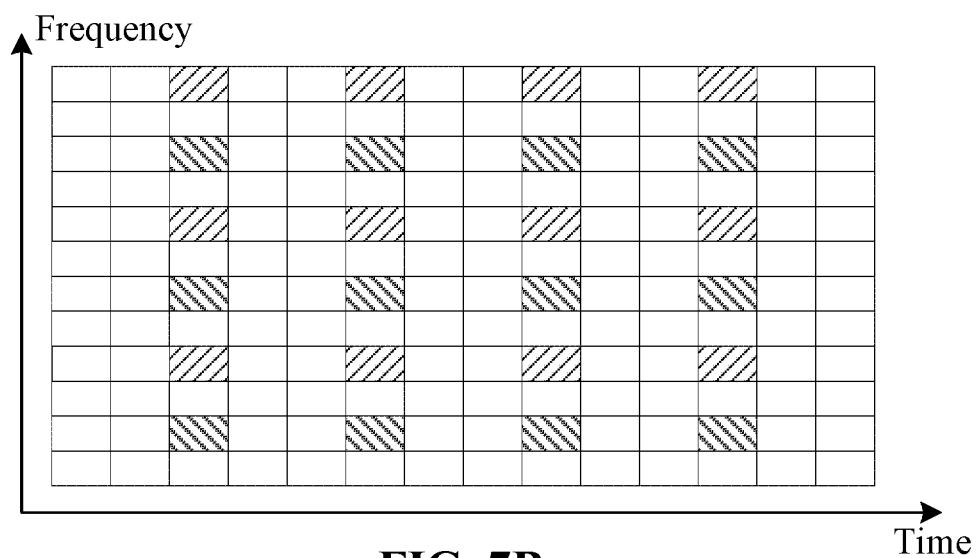
FIG. 7B illustrates an example for multiplexing of different TRS resources in a FDM manner in accordance with some embodiments of the disclosure.
Figure 7C:
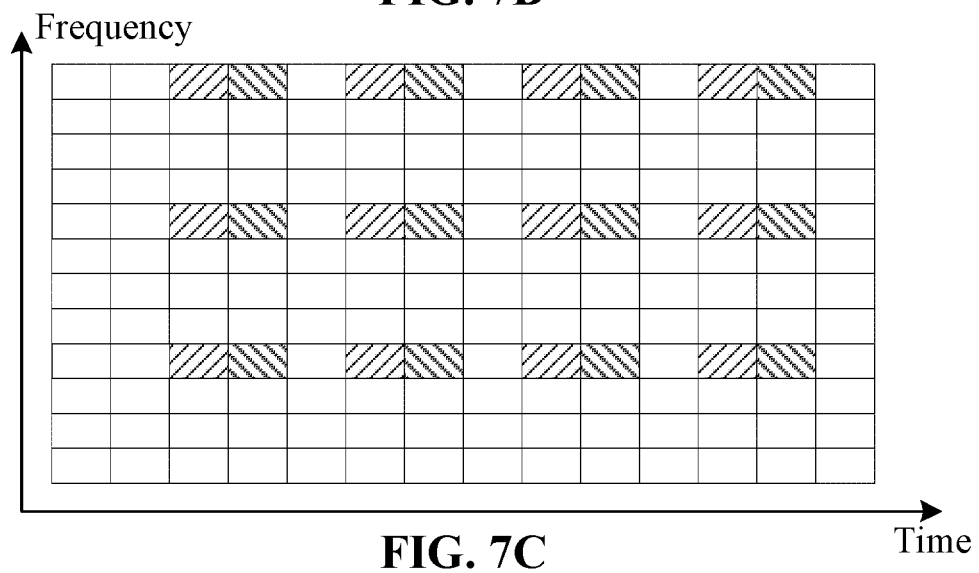
FIG. 7C illustrates an example for multiplexing of different TRS resources in a TDM manner in accordance with some embodiments of the disclosure.

In addition, different TRS resources may be multiplexed in a Time Division Multiplexing (TDM) manner and/or a Frequency Division Multiplexing (FDM) manner. FIG. 7B illustrates an example for multiplexing of different TRS resources (indicated with two different shadows of two different directions) in a FDM manner, and FIG. 7C illustrates an example for multiplexing of different TRS resources (indicated with two different shadows of two different directions) in a TDM manner. For the TDM manner, different TRS resources may also be transmitted in different slots.

A cross-carrier and cross-BWP QCL relationship between a TRS and a DMRS and/or a CSI-RS or an SS-block may be pre-defined or configured by higher layer signaling. In an example, for a BWP or component carrier without a TRS, time and/or frequency offset tracking may be performed based on a configured TRS from another BWP or component carrier. In an embodiment, the TRS may be a CSI-RS.

At 620, the AN 111 may transmit the TRS processed at 615 to the UE 101. In an embodiment, the TRS may be transmitted in a manner selected from a periodic manner, an aperiodic manner, and a semi-persistent manner.

The UE 101 may receive the TRS transmitted at 620 by the AN 111, and process (e.g., demodulate, decode, detect, etc.), at 625, the received TRS to estimate the time and/or frequency offset. In an embodiment, the UE 101 may estimate the time and/or frequency offset based on the TRS and the SS block or CSI-RS QCLed with the TRS.

In addition, in an embodiment, a gap period for decoding a TRS may be determined, so as to support a multi-TRP operation. The gap period may enable the UE 101 to switch, from measuring a time and/or frequency offset of the AN 111, to measure a time and/or frequency offset of another access node (such as the AN 112 shown in FIG. 1). In an embodiment, the gap period may be configured by a higher layer signaling. In an embodiment, the UE 101 may process (e.g., demodulate, decode, detect, etc.) another TRS received from another access node (such as the AN 112) during the gap period, wherein during the gap period, no data will be transmitted from the AN 111 to the UE 101, and thus the UE 101 will not receive any data from the AN 111.

Figure 8:
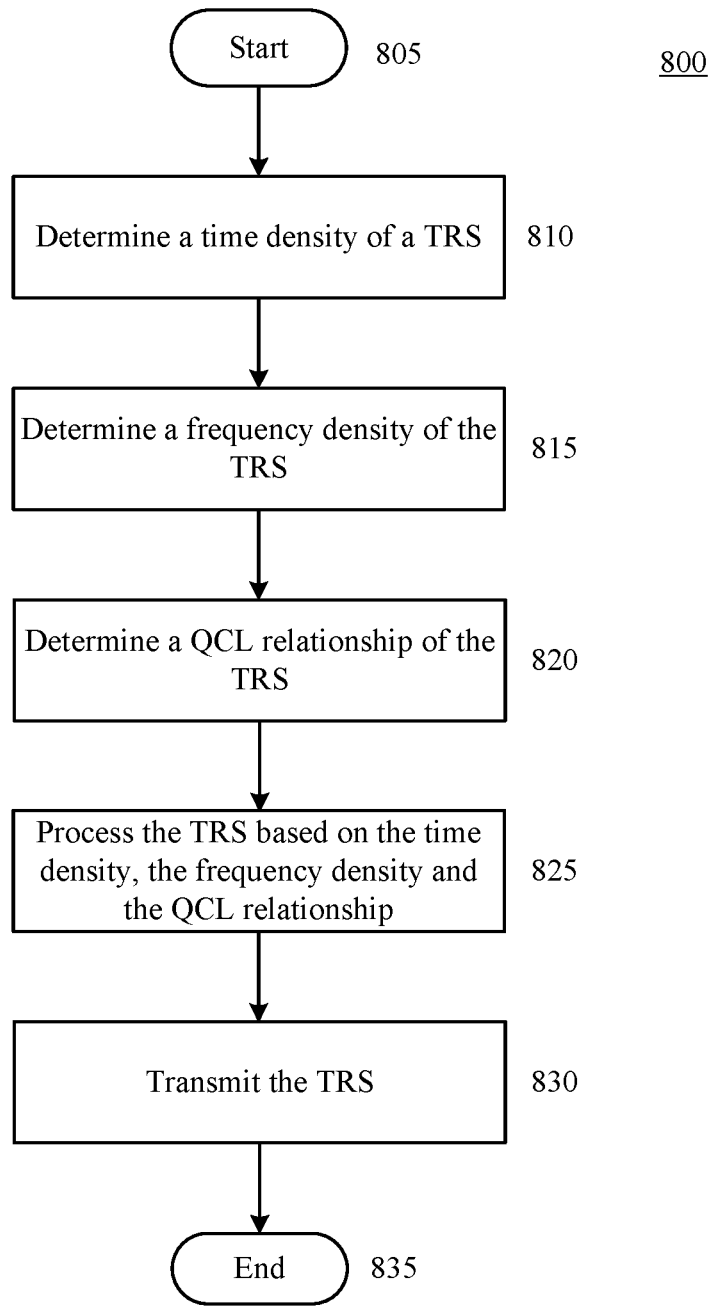
FIG. 8 is a flow chart showing a method performed by an access node for configuration of a TRS for time and/or frequency offset tracking in accordance with some embodiments of the disclosure.

FIG. 8 is a flow chart showing a method performed by an access node for configuration of a TRS for time and/or frequency offset tracking in accordance with some embodiments of the disclosure. The operations of FIG. 8 may be used for an AN (e.g., AN 111) of a RAN (e.g., RAN 110) to process a TRS for transmission to a UE (e.g., UE 101) for time and/or frequency offset tracking.

The method starts at 805. At 810-820, the AN 111 may determine a time density of a TRS based on a subcarrier spacing of a BWP in a current component carrier for the UE 101, a frequency density of the TRS based on a bandwidth of the TRS, and a QCL relationship of the TRS respectively. Then at 825, the AN 111 may process (e.g., modulate, encode, determine, etc.) the TRS, based on at least one of the time density, the frequency density and the QCL relationship determined at 810-820, for transmission to the UE 101. At 830, the AN 111 may transmit the TRS processed at 825 to the UE 101 for time and/or frequency offset tracking.

For the sake of brevity, some embodiments which have already been described in detail with reference to FIG. 6 and FIGS. 7A-7C will not be repeated herein. The method ends at 835.

Figure 9:
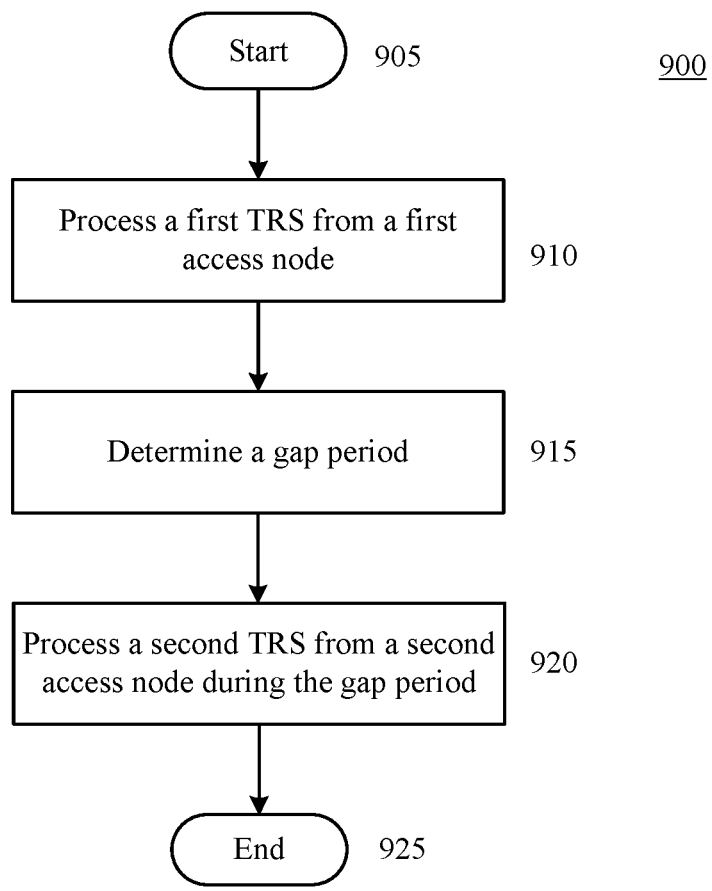
FIG. 9 is a flow chart showing a method performed by a UE for configuration of a TRS for time and/or frequency offset in accordance with some embodiments of the disclosure.

FIG. 9 is a flow chart showing a method performed by a UE for configuration of a TRS for time and/or frequency offset in accordance with some embodiments of the disclosure. The operations of FIG. 9 may be used for a multi-TRP operation to enable a UE (e.g., UE 101) to process different TRSs received from different ANs (e.g., AN 111 and AN 112) of a RAN (e.g., RAN 110) for time and/or frequency offset tracking.

The method starts at 905. At 910, The UE 101 may process (e.g., demodulate, decode, detect, etc.) a first TRS received from a first access node (such as the AN 111) to measure a time and/or frequency offset of the AN 111. At 915, The UE 101 may determine a gap period. The gap period may enable the UE 101 to switch, from measuring a time and/or frequency offset of the AN 111, to measure a time and/or frequency offset of a second access node (such as the AN 112). At 920, The UE 101 may process (e.g., demodulate, decode, detect, etc.) a second TRS received from a second access node (such as the AN 112) to measure a time and/or frequency offset of the AN 112. During the gap period, no data will be transmitted from the AN 111 to the UE 101, and thus the UE 101 will not receive any data from the AN 111.

For the sake of brevity, some embodiments which have already been described in detail with reference to FIG. 6 and FIGS. 7A-7C will not be repeated herein. The method ends at 925.

Figure 10:
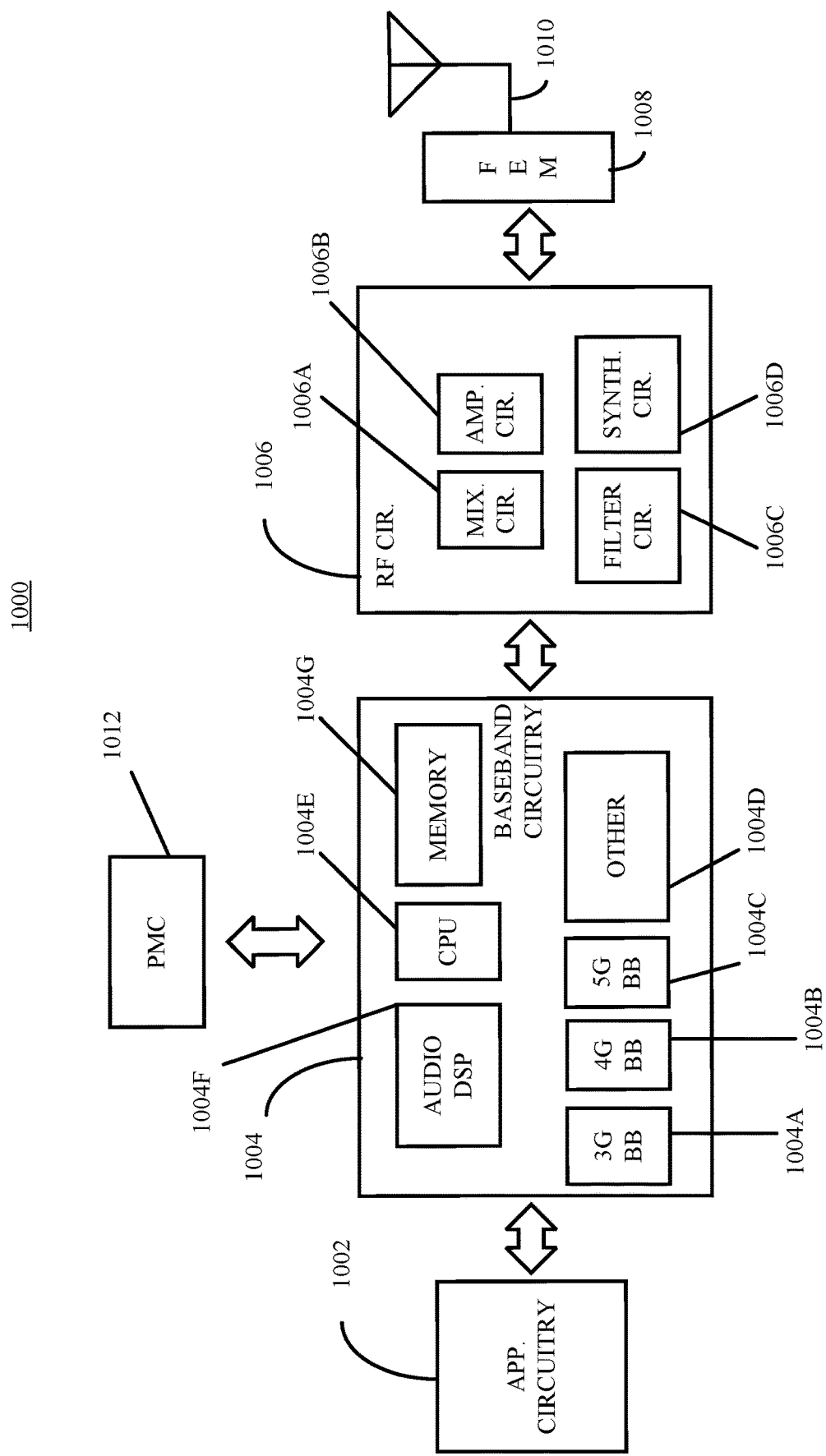
FIG. 10 illustrates example components of a device in accordance with some embodiments of the disclosure.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or an AN. In some embodiments, the device 1000 may include less elements (e.g., an AN may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuity 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), preceding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the AN as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer, Layer 1 may comprise a physical (PHY) layer of a UE/AN.

Figure 11:
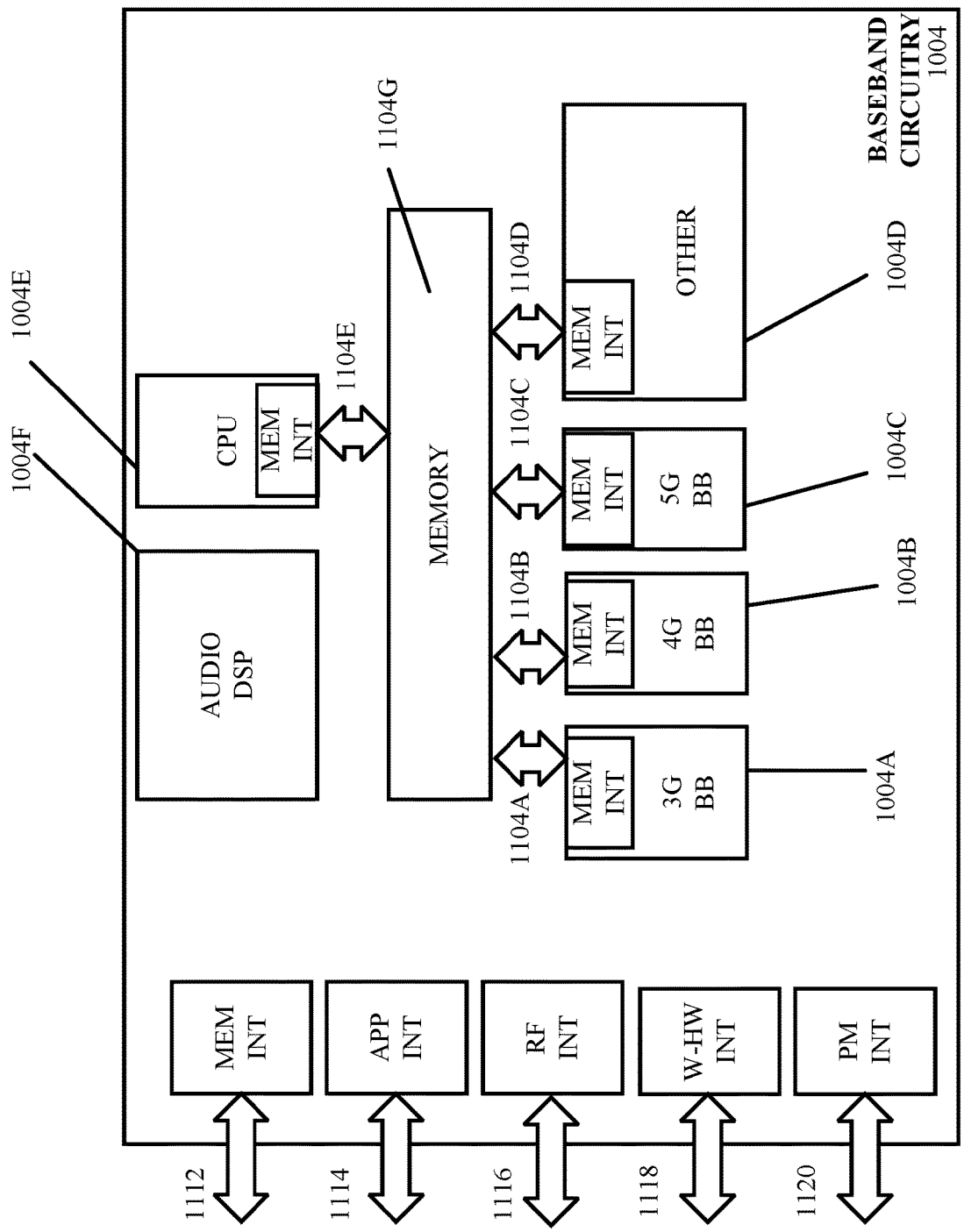
FIG. 11 illustrates example interfaces of baseband circuitry in accordance with some embodiments.

FIG. 11 illustrates example interfaces of baseband circuitry in accordance with some embodiments. As discussed above, the baseband circuitry 1004 of FIG. 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1112.

Figure 12:
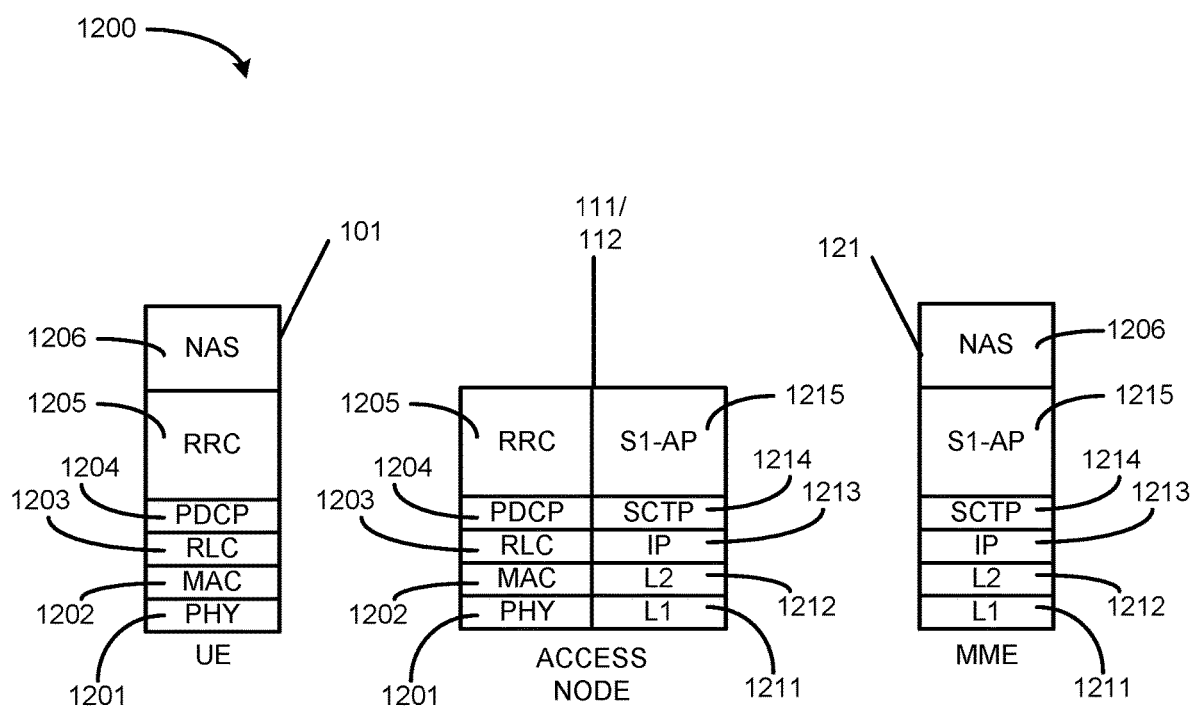
FIG. 12 is an illustration of a control plane protocol stack in accordance with some embodiments.

FIG. 12 is an illustration of a control plane protocol stack in accordance with some embodiments. In this embodiment, a control plane 1200 is shown as a communications protocol stack between the UE 101, the AN 111 (or alternatively, the AN 112), and the MME 121.

The PHY layer 1201 may transmit or receive information used by the MAC layer 1202 over one or more air interfaces. The PHY layer 1201 may further perform link adaptation or adaptive modulation and coding (AMC), power control, cell search (e.g., for initial synchronization and handover purposes), and other measurements used by higher layers, such as the RRC layer 1205. The PHY layer 1201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TB s, scheduling information reporting, error correction through hybrid automatic repeat request (HARQ), and logical channel prioritization.

The RLC layer 1203 may operate in a plurality of modes of operation, including: Transparent Mode (TM), Unacknowledged Mode (UM), and Acknowledged Mode (AM). The RLC layer 1203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the AN 111 may utilize a Uu interface (e.g., an LTE-Uu interface) to exchange control plane data via a protocol stack comprising the PHY layer 1201, the MAC layer 1202, the RLC layer 1203, the PDCP layer 1204, and the RRC layer 1205.

The non-access stratum (NAS) protocols 1206 form the highest stratum of the control plane between the UE 101 and the MME 121. The NAS protocols 1206 support the mobility of the UE 101 and the session management procedures to establish and maintain IP connectivity between the UE 101 and the P-GW 123.

The S1 Application Protocol (S1-AP) layer 1215 may support the functions of the S1 interface and comprise Elementary Procedures (EPs). An EP is a unit of interaction between the AN 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1214 may ensure reliable delivery of signaling messages between the AN 111 and the MME 121 based, in part, on the IP protocol, supported by the IP layer 1213. The L2 layer 1212 and the L1 layer 1211 may refer to communication links (e.g., wired or wireless) used by the RAN node and the MME to exchange information.

The AN 111 and the MME 121 may utilize an S1-MME interface to exchange control plane data via a protocol stack comprising the L1 layer 1211, the L2 layer 1212, the IP layer 1213, the SCTP layer 1214, and the S1-AP layer 1215.

Figure 13:
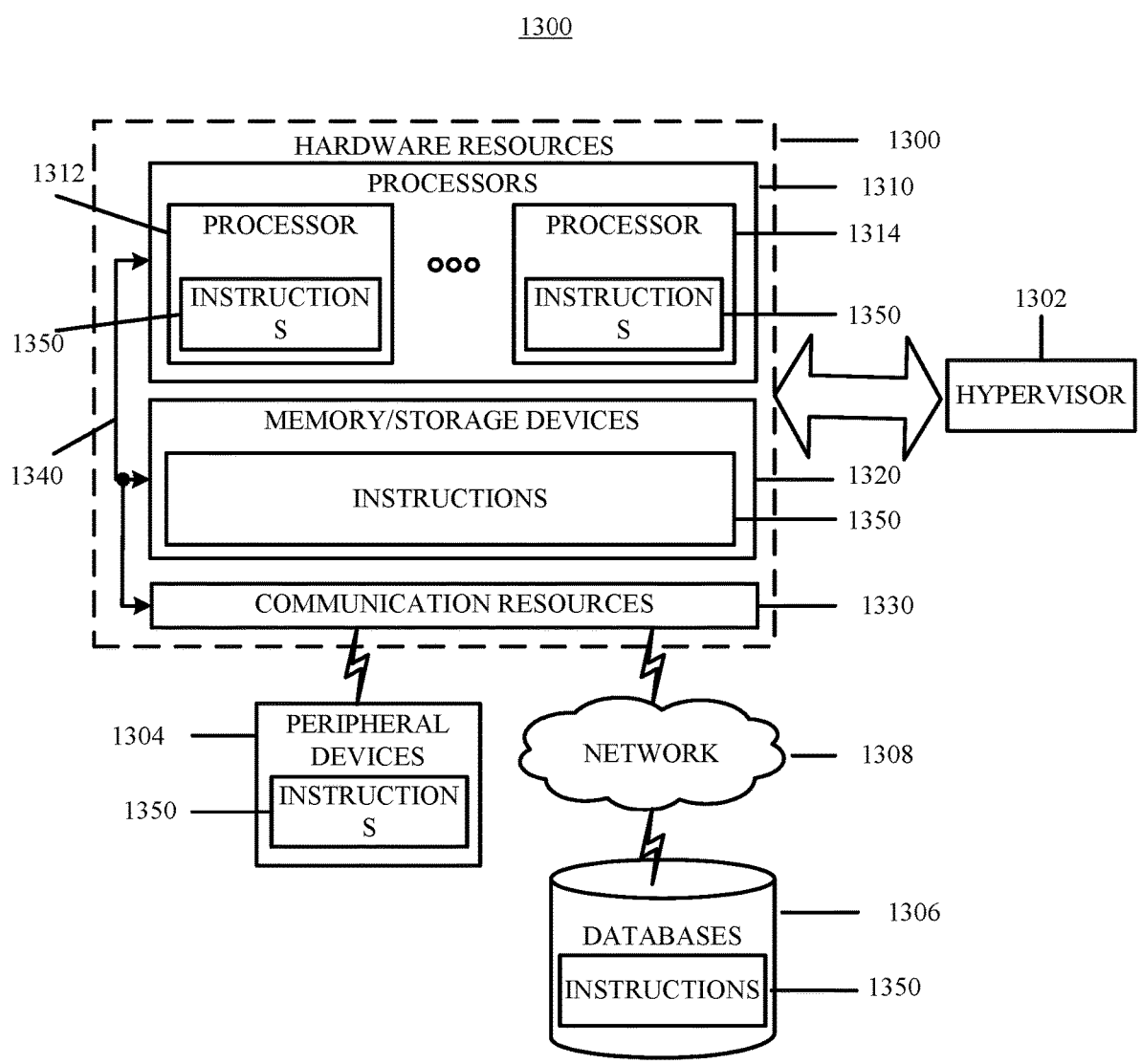
FIG. 13 is a block diagram illustrating components, according to some example embodiments, able to read instructions from a machine-readable or computer-readable medium and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

The memory/storage devices 1320 may include main memory, disk storage, or any suitable combination thereof. The memory/storage devices 1320 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

The following paragraphs describe examples of various embodiments.

Example 1 includes an apparatus for a user equipment (UE), including a radio frequency (RF) interface; and processing circuitry configured to: decode a plurality of Reference Signals (RSs) received from an access node via a plurality of beams of the access node for the plurality of RSs; determine, based on the decoded RSs, first beam quality for each of a predefined subset of beams among the plurality of beams; determine second beam quality for the predefined subset of beams based on all of the first beam quality; in response to the second beam quality being below a predetermined threshold, determine, based on the decoded RSs, third beam quality for each of one or more beams among the plurality of beams that are not within the predefined subset; and encode, based on the first and third beam quality, a message for transmission to the access node via the RF interface for beam management, wherein the message identifies one or more beam indexes for one or more Synchronization Signal (SS) blocks.

Example 2 includes the apparatus of Example 1, wherein the plurality of RSs are a plurality of SS blocks or a plurality of Channel State Information Reference Signals (CSI-RSs).

Example 3 includes the apparatus of Example 1 or 2, wherein the first beam quality for each of the predefined subset of beams is determined by measuring a Reference Signal Receiving Power (RSRP), a Signal to Interference plus Noise Ratio (SINR), or Reference Signal Receiving Quality (RSRQ) of the beam.

Example 4 includes the apparatus of Example 1 or 2, wherein the second beam quality is an average of all of the first beam quality.

Example 5 includes the apparatus of Example 1 or 2, wherein the third beam quality for each of the one or more beams is determined by measuring a Reference Signal Receiving Power (RSRP), a Signal to Interference plus Noise Ratio (SINR), or Reference Signal Receiving Quality (RSRQ) of the beam.

Example 6 includes the apparatus of Example 1 or 2, wherein each of the beam indexes is a timing index carried by a Demodulation Reference Signal (DMRS) of a Physical Broadcast Channel (PBCH) of an SS block associated with the beam index.

Example 7 includes the apparatus of Example 1 or 2, wherein the message is encoded for transmission via a Physical Uplink Control Channel (PUCCH), a Medium Access Control (MAC) Control Element (CE), or a Radio Resource Control (RRC) signaling.

Example 8 includes the apparatus of Example 1 or 2, wherein the message further identifies beam quality for each of one or more beams corresponding to the one or more beam indexes.

Example 9 includes the apparatus of Example 2, wherein the message further identifies one or more flags for the one or more beam indexes, and if the plurality of RSs are a plurality of SS blocks, each of the flags indicates one of: whether to recommend the access node to add an SS beam corresponding to the beam index associated with the flag into the predefined subset for beam measurement; and whether to recommend the access node to remove an SS beam corresponding to the beam index associated with the flag from the predefined subset.

Example 10 includes the apparatus of Example 2, wherein the message further identifies one or more flags for the one or more beam indexes, and if the plurality of RSs are a plurality of CSI-RSs, each of the flags indicates one of: whether to recommend the access node to add one or more CSI-RS beams into the predefined subset based on the beam index associated with the flag for beam measurement; and whether to recommend the access node to remove one or more CSI-RS beams from the predefined subset based on the beam index associated with the flag.

Example 11 includes the apparatus of Example 1 or 2, wherein for each of RSs associated with the one or more beams not within the predefined subset, a data channel or dedicated signal is transmitted in a slot for the RS.

Example 12 includes the apparatus of Example 1 or 2, wherein for each of RSs associated with the predefined subset of beams, no data channel or dedicated signal is transmitted in a slot for the RS.

Example 13 includes the apparatus of Example 1 or 2, wherein the processing circuitry is further configured to encode an indicator for transmission to the access node, wherein the indicator indicates the maximum number of beams to be measured by the UE in a frame or a timing window.

Example 14 includes an apparatus for an access node, including a radio frequency (RF) interface; and processing circuitry configured to: determine a time density of a Tracking Reference Signal (TRS) based on a subcarrier spacing of a bandwidth part (BWP) in a current component carrier for a user equipment (UE); determine a frequency density of the TRS based on a bandwidth of the TRS; determine a quasi co-location (QCL) relationship of the TRS; and encode the TRS based on at least one of the time density, the frequency density and the QCL relationship for transmission to the UE via the RF interface.

Example 15 includes the apparatus of Example 14, wherein the time density indicates the number M of slots for the TRS.

Example 16 includes the apparatus of Example 15, wherein the number M of slots for the TRS is determined by a higher layer signaling or a Downlink Control Information (DCI).

Example 17 includes the apparatus of Example 15, wherein the number of symbols for the TRS in each of the slots is predetermined or configured by a higher layer signaling.

Example 18 includes the apparatus of Example 14, wherein the frequency density indicates the number N of subcarriers carrying the TRS in a symbol of a Physical Resource Block (PRB).

Example 19 includes the apparatus of Example 14, wherein the bandwidth of the TRS is determined based on at least one of: a bandwidth of the BWP, and the subcarrier spacing of the BWP.

Example 20 includes the apparatus of Example 14, wherein the QCL relationship is pre-defined or configured by a higher layer signaling.

Example 21 includes the apparatus of Example 15, wherein the QCL relationship indicates that the TRS is Quasi-Co-Located (QCLed) with a Synchronization Signal (SS) block or a Channel State Information Reference Signal (CSI-RS).

Example 22 includes the apparatus of Example 21, wherein the SS block or the CSI-RS is within the BWP in the current component carrier.

Example 23 includes the apparatus of Example 21, wherein the SS block or the CSI-RS is within another BWP in the current component carrier or another component carrier, which is different from the BWP in the component carrier for the TRS.

Example 24 includes the apparatus of Example 21, wherein the TRS is transmitted in M−1 consecutive slots before or after the SS block or the CSI-RS.

Example 25 includes the apparatus of Example 14, wherein the TRS is transmitted in a manner selected from a periodic manner, an aperiodic manner, and a semi-persistent manner.

Example 26 includes the apparatus of Example 14, wherein the TRS is encoded in response to a higher layer signaling or a Downlink Control Information (DCI).

Example 27 includes the apparatus of Example 14, wherein the TRS is encoded in response to a request for the TRS received from the UE.

Example 28 includes an apparatus for a user equipment (UE), including a radio frequency (RF) interface; and processing circuitry configured to: decode a first Tracking Reference Signal (TRS) received from a first access node via the RF interface, wherein the time density of the first TRS is determined based on a subcarrier spacing of a bandwidth part (BWP) in a current component carrier for the UE, and the frequency density of the first TRS is determined based on a bandwidth of the first TRS.

Example 29 includes the apparatus of Example 28, wherein the processing circuitry is further configured to encode a request for the first TRS for transmission to the first access node.

Example 30 includes the apparatus of Example 29, wherein the request is transmitted via one of a Physical Random Access Channel (PRACH), a Physical Uplink Control Channel (PUCCH), and a higher layer signaling.

Example 31 includes the apparatus of any of Examples 28-30, wherein the processing circuitry is further configured to: determine a gap period; and decode a second TRS received from a second access node during the gap period, wherein during the gap period, no data is transmitted from the first access node to the UE.

Example 32 includes a method performed at a user equipment (UE), including: decoding a plurality of Reference Signals (RSs) received from an access node via a plurality of beams of the access node for the plurality of RSs; determining, based on the decoded RSs, first beam quality for each of a predefined subset of beams among the plurality of beams; determining second beam quality for the predefined subset of beams based on all of the first beam quality; in response to the second beam quality being below a predetermined threshold, determining, based on the decoded RSs, third beam quality for each of one or more beams among the plurality of beams that are not within the predefined subset; and encoding, based on the first and third beam quality, a message for transmission to the access node for beam management, wherein the message identifies one or more beam indexes for one or more Synchronization Signal (SS) blocks.

Example 33 includes the method of Example 32, wherein the plurality of RSs are a plurality of SS blocks or a plurality of Channel State Information Reference Signals (CSI-RSs).

Example 34 includes the method of Example 32 or 33, wherein the first beam quality for each of the predefined subset of beams is determined by measuring a Reference Signal Receiving Power (RSRP), a Signal to Interference plus Noise Ratio (SINR), or Reference Signal Receiving Quality (RSRQ) of the beam.

Example 35 includes the method of Example 32 or 33, wherein the second beam quality is an average of all of the first beam quality.

Example 36 includes the method of Example 32 or 33, wherein the third beam quality for each of the one or more beams is determined by measuring a Reference Signal Receiving Power (RSRP), a Signal to Interference plus Noise Ratio (SINR), or Reference Signal Receiving Quality (RSRQ) of the beam.

Example 37 includes the method of Example 32 or 33, wherein each of the beam indexes is a timing index carried by a Demodulation Reference Signal (DMRS) of a Physical Broadcast Channel (PBCH) of an SS block associated with the beam index.

Example 38 includes the method of Example 32 or 33, wherein the message is encoded for transmission via a Physical Uplink Control Channel (PUCCH), a Medium Access Control (MAC) Control Element (CE), or a Radio Resource Control (RRC) signaling.

Example 39 includes the method of Example 32 or 33, wherein the message further identifies beam quality for each of one or more beams corresponding to the one or more beam indexes.

Example 40 includes the method of Example 33, wherein the message further identifies one or more flags for the one or more beam indexes, and if the plurality of RSs are a plurality of SS blocks, each of the flags indicates one of: whether to recommend the access node to add an SS beam corresponding to the beam index associated with the flag into the predefined subset for beam measurement; and whether to recommend the access node to remove an SS beam corresponding to the beam index associated with the flag from the predefined subset.

Example 41 includes the method of Example 33, wherein the message further identifies one or more flags for the one or more beam indexes, and if the plurality of RSs are a plurality of CSI-RSs, each of the flags indicates one of: whether to recommend the access node to add one or more CSI-RS beams into the predefined subset based on the beam index associated with the flag for beam measurement; and whether to recommend the access node to remove one or more CSI-RS beams from the predefined subset based on the beam index associated with the flag.

Example 42 includes the method of Example 32 or 33, wherein for each of RSs associated with the one or more beams not within the predefined subset, a data channel or dedicated signal is transmitted in a slot for the RS.

Example 43 includes the method of Example 32 or 33, wherein for each of RSs associated with the predefined subset of beams, no data channel or dedicated signal is transmitted in a slot for the RS.

Example 44 includes the method of Example 32 or 33, wherein the method further includes encoding an indicator for transmission to the access node, wherein the indicator indicates the maximum number of beams to be measured by the UE in a frame or a timing window.

Example 45 includes a method performed at an access node, including: determining a time density of a Tracking Reference Signal (TRS) based on a subcarrier spacing of a bandwidth part (BWP) in a current component carrier for a user equipment (UE); determining a frequency density of the TRS based on a bandwidth of the TRS; determining a quasi co-location (QCL) relationship of the TRS; and encoding the TRS based on at least one of the time density, the frequency density and the QCL relationship for transmission to the UE.

Example 46 includes the method of Example 45, wherein the time density indicates the number M of slots for the TRS.

Example 47 includes the method of Example 46, wherein the number M of slots for the TRS is determined by a higher layer signaling or a Downlink Control Information (DCI).

Example 48 includes the method of Example 46, wherein the number of symbols for the TRS in each of the slots is predetermined or configured by a higher layer signaling.

Example 49 includes the method of Example 45, wherein the frequency density indicates the number N of subcarriers carrying the TRS in a symbol of a Physical Resource Block (PRB).

Example 50 includes the method of Example 45, wherein the bandwidth of the TRS is determined based on at least one of: a bandwidth of the BWP, and the subcarrier spacing of the BWP.

Example 51 includes the method of Example 45, wherein the QCL relationship is pre-defined or configured by a higher layer signaling.

Example 52 includes the method of Example 46, wherein the QCL relationship indicates that the TRS is Quasi-Co-Located (QCLed) with a Synchronization Signal (SS) block or a Channel State Information Reference Signal (CSI-RS).

Example 53 includes the method of Example 52, wherein the SS block or the CSI-RS is within the BWP in the current component carrier.

Example 54 includes the method of Example 52, wherein the SS block or the CSI-RS is within another BWP in the current component carrier or another component carrier, which is different from the BWP in the component carrier for the TRS.

Example 55 includes the method of Example 52, wherein the TRS is transmitted in M−1 consecutive slots before or after the SS block or the CSI-RS.

Example 56 includes the method of Example 45, wherein the TRS is transmitted in a manner selected from a periodic manner, an aperiodic manner, and a semi-persistent manner.

Example 57 includes the method of Example 45, wherein the TRS is encoded in response to a higher layer signaling or a Downlink Control Information (DCI).

Example 58 includes the method of Example 45, wherein the TRS is encoded in response to a request for the TRS received from the UE.

Example 59 includes a method performed at a user equipment (UE), including: decoding a first Tracking Reference Signal (TRS) received from a first access node, wherein the time density of the first TRS is determined based on a subcarrier spacing of a bandwidth part (BWP) in a current component carrier for the UE, and the frequency density of the first TRS is determined based on a bandwidth of the first TRS.

Example 60 includes the method of Example 59, wherein the method further includes encoding a request for the first TRS for transmission to the first access node.

Example 61 includes the method of Example 60, wherein the request is transmitted via one of a Physical Random Access Channel (PRACH), a Physical Uplink Control Channel (PUCCH), and a higher layer signaling.

Example 62 includes the method of any of Examples 59-61, wherein the method further includes: determining a gap period; and decoding a second TRS received from a second access node during the gap period, wherein during the gap period, no data is transmitted from the first access node to the UE.

Example 63 includes a computer-readable medium having instructions stored thereon, the instructions when executed by one or more processor(s) causing the processor(s) to perform the method of any of Examples 32-62.

Example 64 includes an apparatus for a user equipment (UE), including means for performing the actions of the method of any of Examples 32-44 and 59-62.

Example 65 includes an apparatus for an access node (AN), including means for performing the actions of the method of any of Examples 45-58.

Example 66 includes a user equipment (UE) as shown and described in the description.

Example 67 includes an access node (AN) as shown and described in the description.

Example 68 includes a method performed at a user equipment (UE) as shown and described in the description.

Example 69 includes a method performed at an access node (AN) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus for an access node, comprising; processing circuitry configured to:
    determine a number of slots for a Tracking Reference Signal (TRS) based on a subcarrier spacing of a bandwidth part (BWP) in a current component carrier for a user equipment (UE);
    cause transmission of downlink control information (DCI) to the UE that indicates the number of slots for the TRS;
    determine a frequency density of the TRS based on a bandwidth for the TRS;
    determine a quasi co-location (QCL) relationship of the TRS, wherein the QCL relationship indicates that the TRS is Quasi-Co-Located (QCLed) with a Synchronization Signal (SS) block or a Channel State Information Reference Signal (CSI-RS);
    encode the TRS based on at least one of the number of slots, the frequency density and the QCL relationship; and
    cause transmission of the TRS to the UE.

2. The apparatus of claim 1, wherein the frequency density indicates a number of subcarriers carrying the TRS in a symbol of a Physical Resource Block (PRB).

3. The apparatus of claim 1, wherein the bandwidth of the TRS is determined based on at least one of: a bandwidth of a bandwidth part (BWP), and a subcarrier spacing of the BWP.

4. The apparatus of claim 1, wherein the QCL relationship is pre-defined or configured by a higher layer signaling.

5. The apparatus of claim 1, wherein the CSI-RS is within a bandwidth part (BWP) in a current component carrier.

6. The apparatus of claim 1, wherein the CSI-RS is within another bandwidth part (BWP) in a current component carrier or another component carrier, which is different from a BWP in a component carrier for the TRS.

7. The apparatus of claim 1, wherein a number of symbols for the TRS in each slot is predetermined or configured by a higher layer signaling.

8. The apparatus of claim 1, wherein the processing circuitry is configured to transmit the TRS in response to a received request for a TRS from the UE via a Physical Random Access Channel (PRACH).

9. An apparatus for a user equipment (UE), comprising processing circuitry configured to:
    encode a request for a first Tracking Reference Signal (TRS) for transmission to a first access node via a Physical Random Access Channel (PRACH);
    decode the first TRS received from the first access node, wherein a time density of the first TRS is based on a subcarrier spacing of a bandwidth part (BWP) in a current component carrier for the UE, and a frequency density of the first TRS is based on a bandwidth for the first TRS;
    determine a gap period for measuring a time and/or frequency offset of a second access node; and
    decode a second TRS received from the second access node during the gap period, wherein during the gap period, no data is transmitted from the first access node to the UE.

10. The apparatus of claim 9, wherein a number of slots for the TRS is determined by a Downlink Control Information (DCI).

11. The apparatus of claim 9, wherein the bandwidth of the TRS is determined based on at least one of: a bandwidth of the BWP, and the subcarrier spacing of the BWP.

12. The apparatus of claim 9, wherein a number of symbols for the TRS in each slot is predetermined or configured by a higher layer signaling.

* * * * *